(12) United States Patent
Abe et al.

(10) Patent No.: US 7,867,416 B2
(45) Date of Patent: Jan. 11, 2011

(54) THERMOPLASTIC ELASTOMER COMPOSITION FOR CORE-BACK SYSTEM FOAM INJECTION MOLDING AND FOAM INJECTION MOLDING METHOD USING THE SAME

(75) Inventors: Tomokazu Abe, Saitama (JP); Katumasa Ieda, Saitama (JP); Akihiko Morikawa, Mie (JP); Kentarou Kanae, Mie (JP)

(73) Assignees: Honda Motor Co., Ltd., Tokyo (JP); JSR Corporation, Tokyo (JP)

( * ) Notice: Subject to any disclaimer, the term of this patent is extended or adjusted under 35 U.S.C. 154(b) by 0 days.

(21) Appl. No.: 12/344,915

(22) Filed: Dec. 29, 2008

(65) Prior Publication Data
US 2009/0108485 A1    Apr. 30, 2009

Related U.S. Application Data

(62) Division of application No. 10/487,244, filed as application No. PCT/JP02/08791 on Aug. 30, 2002, now abandoned.

(30) Foreign Application Priority Data

Aug. 31, 2001   (JP)   ............................. 2001-265016
Aug. 31, 2001   (JP)   ............................. 2001-265017

(51) Int. Cl.
  *B32B 37/00*   (2006.01)
(52) U.S. Cl. ..................... 264/45.5; 264/46.4; 264/255; 264/328.7
(58) Field of Classification Search ................ 264/45.5, 264/46.4, 255, 328.7
See application file for complete search history.

(56) References Cited

U.S. PATENT DOCUMENTS

| 4,275,168 | A | * | 6/1981 | Watanabe et al. | ............. 521/82 |
| 5,596,042 | A | | 1/1997 | Itoh et al. | |
| 5,695,699 | A | * | 12/1997 | Naritomi | ................... 264/46.4 |
| 5,932,659 | A | | 8/1999 | Bambara et al. | |
| 6,841,582 | B2 | * | 1/2005 | Morikawa et al. | ............. 521/82 |

FOREIGN PATENT DOCUMENTS

JP    57-16035    1/1982

(Continued)

*Primary Examiner*—Joseph S Del Sole
*Assistant Examiner*—David N Brown, II
(74) *Attorney, Agent, or Firm*—Oblon, Spivak, McClelland, Maier & Neustadt, L.L.P.

(57) ABSTRACT

The thermoplastic elastomer composition of the present invention comprises a thermoplastic elastomer which includes an ethylene•α-olefin copolymer and a crystalline polyethylene resin, wherein the crystalline polyethylene resin constitutes a three-dimensional network structure in a matrix formed by the ethylene•α-olefin copolymer, an organic or inorganic blowing agent and a nucleating agent, wherein the thermoplastic elastomer has a melt flow rate of 5 g/10 min or more at a temperature of 230° C. and a load of 10 kg, and a melt tension of 3.0 gf or more at a temperature of 210° C. and a pulling rate of 2 m/min. Also the foam injection molding method of the present invention is a method including injecting the above-mentioned composition into a cavity space of a metal mold and then expanding the cavity space to foam by opening the metal mold at a mold opening rate of 0.05 to 0.4 mm/sec.

19 Claims, 8 Drawing Sheets

FOREIGN PATENT DOCUMENTS

| | | |
|---|---|---|
| JP | 6-73222 | 3/1994 |
| JP | 6-218742 | 8/1994 |
| JP | 8-27330 | 1/1996 |
| JP | 3118125 | 10/2000 |
| JP | 2001-81251 | 3/2001 |
| WO | WO 01/64784 | 9/2001 |

* cited by examiner (a)

(b)

(a)

(b)

(a)
(b)
(c)
(d)
(e)
(f)

THERMOPLASTIC ELASTOMER COMPOSITION FOR CORE-BACK SYSTEM FOAM INJECTION MOLDING AND FOAM INJECTION MOLDING METHOD USING THE SAME

CROSS-REFERENCE TO RELATED APPLICATIONS

The present invention is a Divisional of U.S. application Ser. No. 10/487,244, filed Sep. 16, 2004, which is a 371 of PCT/JP02/08791, filed Aug. 30, 2002, the entire contents of each of which are hereby incorporated by reference.

TECHNICAL FIELD

The present invention relates to a thermoplastic elastomer composition for core-back system foam injection molding and a foam injection molding method using the same. More specifically, it relates to a thermoplastic elastomer composition capable of providing an injection foaming product having a three-dimensional network structure not chemically crosslinked, also having an excellent processability, a highly closed cell, a uniform cell shape, a uniform cell diameter, and a sufficient elastic recovering property and a sufficient flexibility, and being also excellent in visual appearance, and a foam injection molding method using the same. An injection foaming product obtained by this method can be utilized as an automobile internal part such as an instrument panel or a glove box, an automobile external part such as a weather strip, an electrical part, a vibration-isolating material for an electrical product, other industrial parts, a construction material or a sport good.

BACKGROUND TECHNOLOGY

In recent years, injection foaming products are used as a shock absorbing material and a part with a soft feeling against vibrations and noises in various product field, for example an internal part or an external part of an automobile and the like, a consumer electric product, an information equipment and the like. In particular, a thermoplastic elastomer composition is attracting attention as a material enabling easy molding and easy foaming. Such thermoplastic elastomer composition can be a thermoplastic elastomer composition capable of dynamic crosslinking, and it is known that an injection foaming product can be obtained with a thermoplastic elastomer composition disclosed for example in JP-A-H6-73222.

However, a crosslinking rubber component contained in such dynamically crosslinkable thermoplastic elastomer composition cannot be uniformly foamed and a crystalline polyolefin alone causes a uniform foaming, an inhomogeneous injection foaming product as a whole is obtained. Also since a foaming gas escapes from the surface of the molded article, the surface is not smooth, thus being inferior in appearance. Further odor and discoloration are not reduced sufficiently with the injection foaming product obtained by employing such a thermoplastic elastomer composition. In addition, there are many problems to be solved, such as that the manufacturing process is complicated, that a usable crosslinking agent is expensive, that the application is limited because of a contamination by the crosslinking agent, and the like. And also a non-crosslinked type has a drawback for example of a high compression set, as the obtained injection foaming product does not have a crosslinked structure.

An injection foaming product obtained by employing a thermoplastic elastomer composition described for example in JP-A-H6-73222 as a thermoplastic elastomer composition is flexible in comparison with a prior article. On the other hand, it is also possible to foam a non-crosslinking type olefinic thermoplastic elastomer composition, and such composition can be easily and uniformly foamed by melting.

However, according to the above-mentioned foam injection molding method, since the cell diameter of the injection foaming product becomes large, there is encountered a drawback that an injection foaming product having an adequate flexibility and excellent in cushioning property and the like cannot be obtained. Further the cell diameter is not uniform, and in particular the injection foaming product tends to have significantly different cell diameters in a vicinity of a gate and in an end portion.

DISCLOSURE OF THE INVENTION

The present invention is to solve the above-mentioned drawbacks and an object is to provide a thermoplastic elastomer composition for core-back system foam injection molding capable of obtaining an article having excellent physical properties such as a uniform cell shape, a uniform cell diameter, a highly closed cell and a low compression set, and also a satisfactory visual appearance, and a foam injection molding method using such composition.

The present invention is to attain the above-mentioned object and is described as follows.

1. A thermoplastic elastomer composition for core-back system foam injection molding, comprising a thermoplastic elastomer which includes an ethylene•α-olefin-based copolymer (1) and a crystalline polyethylene-based resin (2), and wherein the crystalline polyethylene-based resin (2) constitutes a three-dimensional network structure in a matrix formed by the ethylene•α-olefin-based copolymer (1), a blowing agent (4) and a nucleating agent (5), wherein the thermoplastic elastomer has a melt flow rate of 5 g/10 min or more at a temperature of 230° C. and a load of 10 kg, and a melt tension of 3.0 gf or more at a temperature of 210° C. and a pulling rate of 2 m/min; and characterized by the thermoplastic elastomer composition for core-back system foam injection molding is injected into a cavity space of a metal mold and is foamed by opening the metal mold thereby expanding the cavity space to form an injection foaming product having a skin layer and a foamed layer.

2. The thermoplastic elastomer composition for core-back system foam injection molding according to above 1, wherein the nucleating agent (5) is an inorganic compound powder of a particle diameter of 2 to 50 μm, and the blowing agent (4) is at least one selected from the group consisting of sodium hydrogencarbonate, ammonium hydrogencarbonate, ammonium chloride and ammonium carbonate, and the composition further comprises at least a weakly acidic compound selected from the group consisting of oxalic acid, malonic acid, citric acid, lactic acid, boric acid, monosodium citrate and acidic potassium tartrate.

3. A thermoplastic elastomer composition for core-back system foam injection molding, comprising a thermoplastic elastomer which includes an ethylene•α-olefin-based copolymer (1) and a crystalline polyethylene-based resin (2), wherein the crystalline polyethylene-based resin (2) constitutes a three-dimensional network structure in a matrix formed by the ethylene•α-olefin-based copolymer (1);

a blowing agent-containing resin in which a blowing agent (4) is kneaded in an olefin resin (6); and a nucleating agent-containing resin in which a nucleating agent (5) is kneaded in an olefin resin (6);

wherein the thermoplastic elastomer has a melt flow rate of 5 g/10 min or more at a temperature of 230° C. and a load of 10 kg, and a melt tension of 3.0 gf or more at a temperature of 210° C. and a pulling rate of 2 m/min; and characterized by the thermoplastic elastomer composition for core-back system foam injection molding is injected into a cavity space of a metal mold and is foamed by opening the metal mold thereby expanding the cavity space to form an injection foaming product having a skin layer and a foamed layer.

4. The thermoplastic elastomer composition for core-back system foam injection molding according to above 3, wherein the nucleating agent (5) is an inorganic compound powder of a particle diameter of 2 to 50 µm, and the blowing agent (4) is at least one selected from the group consisting of sodium hydrogencarbonate, ammonium hydrogencarbonate, ammonium chloride and ammonium carbonate, and the composition further comprises at least a weakly acidic compound selected from the group consisting of oxalic acid, malonic acid, citric acid, lactic acid, boric acid, monosodium citrate and acidic potassium tartrate.

5. A thermoplastic elastomer composition for core-back system foam injection molding, comprising a thermoplastic elastomer which includes an ethylene•α-olefin-based copolymer (1), a crystalline polyethylene-based resin (2) and a following block copolymer (3), wherein the crystalline polyethylene-based resin (2) and the block copolymer (3) constitute a three-dimensional network structure in a matrix formed by the ethylene•α-olefin-based copolymer (1), a blowing agent (4) and a nucleating agent (5);

wherein the thermoplastic elastomer has a melt flow rate of 5 g/10 min or more at a temperature of 230° C. and a load of 10 kg, and a melt tension of 3.0 gf or more at a temperature of 210° C. and a pulling rate of 2 m/min;

the block copolymer (3) is a block copolymer having a crystalline ethylene polymer block and a block having a higher compatibility to the ethylene•α-olefin-based copolymer (1) than to the crystalline polyethylene-based resin (2); and characterized by the thermoplastic elastomer composition for core-back system foam injection molding is injected into a cavity space of a metal mold and is foamed by opening the metal mold thereby expanding the cavity space to form an injection foaming product having a skin layer and a foamed layer.

6. The thermoplastic elastomer composition for core-back system foam injection molding according to above 5, wherein the nucleating agent (5) is an inorganic compound powder of a particle diameter of 2 to 50 µm, and the blowing agent (4) is at least one selected from the group consisting of sodium hydrogencarbonate, ammonium hydrogencarbonate, ammonium chloride and ammonium carbonate, and the composition further comprises at least a weakly acidic compound selected from the group consisting of oxalic acid, malonic acid, citric acid, lactic acid, boric acid, monosodium citrate and acidic potassium tartrate.

7. A thermoplastic elastomer composition for core-back system foam injection molding, comprising a thermoplastic elastomer which includes an ethylene•α-olefin-based copolymer (1), a crystalline polyethylene-based resin (2) and a following block copolymer (3), wherein the crystalline polyethylene-based resin (2) and the block copolymer (3) constitute a three-dimensional network structure in a matrix formed by the ethylene•α-olefin-based copolymer (1);

a blowing agent-containing resin in which a blowing agent (4) is kneaded in an olefin resin (6); and a nucleating agent-containing resin in which a nucleating agent (5) is kneaded in an olefin resin (6);

wherein the thermoplastic elastomer has a melt flow rate of 5 g/10 min or more at a temperature of 230° C. and a load of 10 kg, and a melt tension of 3.0 gf or more at a temperature of 210° C. and a pulling rate of 2 m/min;

the block copolymer (3) is a block copolymer having a crystalline ethylene polymer block and a block having a higher compatibility to the ethylene•α-olefin-based copolymer (1) than to the crystalline polyethylene-based resin (2); and characterized by the thermoplastic elastomer composition for core-back system foam injection molding is injected into a cavity space of a metal mold and is foamed by opening the metal mold thereby expanding the cavity space to form an injection foaming product having a skin layer and a foamed layer.

8. The thermoplastic elastomer composition for core-back system foam injection molding according to above 7, wherein the nucleating agent (5) is an inorganic compound powder of a particle diameter of 2 to 50 µm, and the blowing agent (4) is at least one selected from the group consisting of sodium hydrogencarbonate, ammonium hydrogencarbonate, ammonium chloride and ammonium carbonate, and the composition further comprises at least a weakly acidic compound selected from the group consisting of oxalic acid, malonic acid, citric acid, lactic acid, boric acid, monosodium citrate and acidic potassium tartrate.

9. A thermoplastic elastomer composition for core-back system foam injection molding, comprising a thermoplastic elastomer which includes an ethylene•α-olefin-based copolymer (1) and a crystalline polyethylene-based resin (2), wherein the crystalline polyethylene-based resin (2) constitutes a three-dimensional network structure in a matrix formed by the ethylene•α-olefin-based copolymer (1), an organic blowing agent (4a), an inorganic blowing agent (4b) and a nucleating agent (5);

wherein the thermoplastic elastomer has a melt flow rate of 5 g/10 min or more at a temperature of 230° C. and a load of 10 kg, and a melt tension of 3.0 gf or more at a temperature of 210° C. and a pulling rate of 2 m/min; and characterized by the thermoplastic elastomer composition for core-back system foam injection molding is injected into a cavity space of a metal mold and is foamed by opening the metal mold thereby expanding the cavity space to form an injection foaming product having a skin layer and a foamed layer.

10. The thermoplastic elastomer composition for core-back system foam injection molding according to above 9, wherein the nucleating agent (5) is an inorganic compound powder of a particle diameter of 2 to 50 µm, the organic blowing agent (4a) is at least one selected from the group consisting of an azo-based blowing agent, a nitroso-based blowing agent, a sulfonyl hydrazide-based blowing agent, a triazine-based blowing agent and a tetrazole-based blowing agent, the inorganic blowing agent (4b) is at least one selected from the group consisting of sodium hydrogencarbonate, ammonium hydrogencarbonate, ammonium chloride and ammonium carbonate, and the composition further comprises at least a weakly acidic compound selected from the group consisting of oxalic acid, malonic acid, citric acid, lactic acid, boric acid, monosodium citrate and acidic potassium tartrate.

11. A thermoplastic elastomer composition for core-back system foam injection molding, comprising a thermoplastic elastomer which includes an ethylene•α-olefin-based copolymer (1) and a crystalline polyethylene-based resin (2), wherein the crystalline polyethylene-based resin (2) constitutes a three-dimensional network structure in a matrix formed by the ethylene•α-olefin-based copolymer (1);

(i) an organic blowing agent-containing resin in which an organic blowing agent (4*a*) is kneaded in an olefin resin (6) and an inorganic blowing agent-containing resin in which an inorganic blowing agent (4*b*) is kneaded in an olefin resin (6), or (ii) an organic/inorganic blowing agent-containing resin in which an organic blowing agent (4*a*) and an inorganic blowing agent (4*b*) are kneaded in an olefin resin (6); and a nucleating agent-containing resin in which a nucleating agent (5) is kneaded in an olefin resin (6);

wherein the thermoplastic elastomer has a melt flow rate of 5 g/10 min or more at a temperature of 230° C. and a load of 10 kg, and a melt tension of 3.0 gf or more at a temperature of 210° C. and a pulling rate of 2 m/min; and characterized by the thermoplastic elastomer composition for core-back system foam injection molding is injected into a cavity space of a metal mold and is foamed by opening the metal mold thereby expanding the cavity space to form an injection foaming product having a skin layer and a foamed layer.

12. The thermoplastic elastomer composition for core-back system foam injection molding according to above 11, wherein the nucleating agent (5) is an inorganic compound powder of a particle diameter of 2 to 50 µm, the organic blowing agent (4*a*) is at least one selected from the group consisting of an azo-based blowing agent, a nitroso-based blowing agent, a sulfonyl hydrazide-based blowing agent, a triazine-based blowing agent and a tetrazole-based blowing agent, the inorganic blowing agent (4*b*) is at least one selected from the group consisting of sodium hydrogencarbonate, ammonium hydrogencarbonate, ammonium chloride and ammonium carbonate, and the composition further comprises at least a weakly acidic compound selected from the group consisting of oxalic acid, malonic acid, citric acid, lactic acid, boric acid, monosodium citrate and acidic potassium tartrate.

13. A thermoplastic elastomer composition for core-back system foam injection molding, comprising a thermoplastic elastomer which includes an ethylene•α-olefin-based copolymer (1), a crystalline polyethylene-based resin (2) and a following block copolymer (3), wherein the crystalline polyethylene-based resin (2) and the block copolymer (3) constitute a three-dimensional network structure in a matrix formed by the ethylene•α-olefin-based copolymer (1), an organic blowing agent (4*a*), an inorganic blowing agent (4*b*) and a nucleating agent (5);

wherein the thermoplastic elastomer has a melt flow rate of 5 g/10 min or more at a temperature of 230° C. and a load of 10 kg, and a melt tension of 3.0 gf or more at a temperature of 210° C. and a pulling rate of 2 m/min;

the block copolymer (3) is a block copolymer having a crystalline ethylene polymer block and a block having a higher compatibility to the ethylene•α-olefin-based copolymer (1) than to the crystalline polyethylene-based resin (2); and characterized by the thermoplastic elastomer composition for core-back system foam injection molding is injected into a cavity space of a metal mold and is foamed by opening the metal mold thereby expanding the cavity space to form an injection foaming product having a skin layer and a foamed layer.

14. The thermoplastic elastomer composition for core-back system foam injection molding according to above 13, wherein the nucleating agent (5) is an inorganic compound powder of a particle diameter of 2 to 50 µm, the organic blowing agent (4*a*) is at least one selected from the group consisting of an azo-based blowing agent, a nitroso-based blowing agent, a sulfonyl hydrazide-based blowing agent, a triazine-based blowing agent and a tetrazole-based blowing agent, the inorganic blowing agent (4*b*) is at least one selected from the group consisting of sodium hydrogencarbonate, ammonium hydrogencarbonate, ammonium chloride and ammonium carbonate, and the composition further comprises at least a weakly acidic compound selected from the group consisting of oxalic acid, malonic acid, citric acid, lactic acid, boric acid, monosodium citrate and acidic potassium tartrate.

15. A thermoplastic elastomer composition for core-back system foam injection molding, comprising a thermoplastic elastomer which includes an ethylene•α-olefin-based copolymer (1), a crystalline polyethylene-based resin (2) and a following block copolymer (3), wherein the crystalline polyethylene-based resin (2) and the block copolymer (3) constitute a three-dimensional network structure in a matrix formed by the ethylene•α-olefin-based copolymer (1);

(i) an organic blowing agent-containing resin in which an organic blowing agent (4*a*) is kneaded in an olefin resin (6) and an inorganic blowing agent-containing resin in which an inorganic blowing agent (4*b*) is kneaded in an olefin resin (6), or (ii) an organic/inorganic blowing agent-containing resin in which an organic blowing agent (4*a*) and an inorganic blowing agent (4*b*) are kneaded in an olefin resin (6); and a nucleating agent-containing resin in which a nucleating agent (5) is kneaded in an olefin resin (6);

wherein the thermoplastic elastomer has a melt flow rate of 5 g/10 min or more at a temperature of 230° C. and a load of 10 kg, and a melt tension of 3.0 gf or more at a temperature of 210° C. and a pulling rate of 2 m/min;

the block copolymer (3) is a block copolymer having a crystalline ethylene polymer block and a block having a higher compatibility to the ethylene•α-olefin-based copolymer (1) than to the crystalline polyethylene-based resin (2); and characterized by the thermoplastic elastomer composition for core-back system foam injection molding is injected into a cavity space of a metal mold and is foamed by opening the metal mold thereby expanding the cavity space to form an injection foaming product having a skin layer and a foamed layer.

16. The thermoplastic elastomer composition for core-back system foam injection molding according to above 15, wherein the nucleating agent (5) is an inorganic compound powder of a particle diameter of 2 to 50 µm, the organic blowing agent (4*a*) is at least one selected from the group consisting of an azo-based blowing agent, a nitroso-based blowing agent, a sulfonyl hydrazide-based blowing agent, a triazine-based blowing agent and a tetrazole-based blowing agent, the inorganic blowing agent (4*b*) is at least one selected from the group consisting of sodium hydrogencarbonate, ammonium hydrogencarbonate, ammonium chloride and ammonium carbonate, and the composition further comprises at least a weakly acidic compound selected from the group consisting of oxalic acid, malonic acid, citric acid, lactic acid, boric acid, monosodium citrate and acidic potassium tartrate.

17. A foam injection molding method characterized by comprising injecting a thermoplastic elastomer composition for core-back system foam injection molding according to any of above 1 to 16 into a cavity space in a metal mold, thereafter opening the metal mold at a mold opening rate of 0.05 to 0.4 mm/sec thereby expanding the cavity space to foam the thermoplastic elastomer composition and forming an injection foaming product having a skin layer and a foamed layer.

18. The foam injection molding method according to above 17, wherein a metal mold retraction delay time is 0 to 5 seconds after the completion of filling.

19. The foam injection molding method according to above 17, wherein the mold opening is executed in such a manner that a final thickness of the injection foaming product becomes 1.1 to 5.0 times of an initial thickness of the material filled in the cavity space in the metal mold.

20. The foam injection molding method according to above 17, wherein the injection foaming product is formed on a surface of a base body.

EMBODIMENTS OF THE INVENTION

The above-mentioned "ethylene•α-olefin-based copolymer (1)" (hereinafter, referred to as "EAO-based copolymer (1)") is a copolymer obtained from ethylene and an α-olefin other than ethylene, as main monomers. The content of ethylene unit in the EAO-based copolymer (1) is preferably from 40 to 90 mol %, particularly preferably from 50 to 90 mol % based on 100 mol % of total of the ethylene unit and the α-olefin unit. The content of the ethylene unit less than 40 mol % may reduce the mechanical strength of the injection foaming product. On the other hand, the content exceeding 90 mol % may cause an excessively high hardness.

For the EAO-based copolymer (1), there can be employed a copolymer having an olefin unit as a principal component, such as ethylene.propylene copolymer, ethylene.propylene.non-conjugated diene copolymer, ethylene.butene-1 copolymer, ethylene.butene-1.non-conjugated diene copolymer, ethylene.octene-1 copolymer and ethylene.octene-1.non-conjugated diene copolymer. These copolymers may be used alone or in combination of two or more. As the non-conjugated diene, ethylidene norbornene, dicyclopentadiene, 1,4-hexadiene or the like is preferred. Such non-conjugated diene is preferably used in such a ratio that iodine value of the EAO-based copolymer (1) becomes 40 or less.

Mooney viscosity of the EAO-based copolymer (1) is not particularly limited, but is preferably from 10 to 500 $ML_{1+4}$ (100° C.), particularly preferably from 30 to 400 $ML_{1+4}$ (100° C.). The Mooney viscosity less than 10 $ML_{1+4}$ (100° C.) tends to reduce the mechanical strength and the elastic recovery rate of the injection foaming product. On the other hand, the value exceeding 500 $ML_{1+4}$ (100° C.) may undesirably lead to an insufficient dispersion of the crystalline polyethylene-based resin (2).

The above-mentioned "crystalline polyethylene-based resin (2)" is formed with ethylene as a principal monomer and has a content of ethylene unit from 90 to 100 mol %. Also, in case the crystalline polyethylene-based resin (2) is dissolved in boiling n-hexane, an insoluble portion is preferably 10 mass % or more, particularly preferably 20 mass % or more (normally 95 mass % or less). The insoluble portion less than 10 mass % may deteriorate the processability of the obtained thermoplastic elastomer composition and the mechanical strength of the injection foaming product. Further, the crystalline polyethylene-based resin (2) preferably has a melting peak, measured by a differential scanning calorimeter, of 100° C. or higher.

The crystalline polyethylene-based resin (2) can be, in addition to polyethylene, a copolymer formed by copolymerizing ethylene and an α-olefin having 3 to 8 carbon atoms such as propylene, butene-1,4-methyl-pentene-1, hexane-1 or octane-1 and having a content of ethylene unit of 90 mol % or more, and the like. For the polyethylene, there can be employed any of low-density polyethylene produced by a high pressure process, high-density polyethylene produced by a medium/low pressure process, and linear low-density polyethylene, and it is also possible to use two or more kinds produced by different processes in combination.

As to the contents of the EAO-based copolymer (1) and the crystalline polyethylene-based resin (2) based on 100 mass % of total of these, the EAO-based copolymer (1) is contained preferably in the range from 10 to 94 mass %, more preferably 20 to 94 mass % and particularly preferably 40 to 94 mass %. Also the crystalline polyethylene-based resin (2) is contained preferably in the range from 5 to 80 mass %, more preferably 5 to 50 mass % and particularly preferably 5 to 30 mass %. The content of the EAO-based copolymer (1) less than 10 mass % may undesirably lower the elastic recovering property of the injection foaming product, while the content exceeding 94 mass % may undesirably deteriorate the processability of the obtained thermoplastic elastomer composition. And the content of the crystalline polyethylene-based resin (2) less than 5 mass % may lower the elastic recovering property, while the content exceeding 80 mass % tends to undesirably deteriorate the elasticity.

The above-mentioned "block copolymer (3)" includes a block having a high compatibility to the EAO-based copolymer (1) and a block having a high compatibility to the crystalline polyethylene-based resin (2). It is therefore estimated that the EAO-based copolymer (1) and the crystalline polyethylene-based resin (2) are bridged across the block copolymer (3) and that the EAO-based copolymer (1) constitutes a matrix in which the crystalline polyethylene-based resin (2) and the block copolymer (3) form a three-dimensional network structure.

A crystalline ethylene-based polymer block constituting the block copolymer (3) can be a block formed by an ethylene homopolymer or a block formed by a copolymer having a content of ethylene unit of 50 mol % or more. The block copolymer (3) preferably has crystalline ethylene polymer blocks at both ends. Such block copolymer (3) can form a particularly uniform three-dimensional network structure. Usually, each of the crystalline polyethylene-based resin (2) and the block copolymer (3) forms a three-dimensional network structure.

The block copolymer (3) is preferably obtained by hydrogenation of a block copolymer in which both end blocks are formed by butadiene polymer blocks, an intermediate block is formed by at least either of a conjugated diene polymer block or a vinyl aromatic compound.conjugated diene random copolymer, and a content of a 1,2-vinyl bond in the both end blocks is less than a content of a 1,2-vinyl bond in the intermediate block.

As to the contents of the end blocks and the intermediate block based on 100 mass % of total of these before hydrogenation, it is more preferable that the both end blocks are contained in the range from 5 to 90 mass %, particularly from 10 to 80 mass % and have a content of 1,2-vinyl bond of 25 mol % or less, and the intermediate block has a content of 1,2-vinyl bond of 25 mol % or more. The content of the both end blocks less than 5 mass % provides a large difference in the crystallinity from the EAO-based copolymer (1) constituting the matrix, whereby it becomes difficult to form the three-dimensional network structure. On the other hand, the content exceeding 90 mass % may excessively increase the hardness of the injection foaming product and is therefore undesirable.

The both end blocks are preferably 1,3-butadiene polymer blocks in which the content of 1,3-butadiene unit is 90 mass % or more, particularly 95 mass % or more. The content of the 1,2-vinyl bond of the both end blocks is preferably 25 mol % or less, more preferably 20 mol % or less, and particularly preferably 15 mol % or less. The content of the 1,2-vinyl bond of the both end blocks 25 mol % or more induces a significant drop of the melting point of the crystal after the hydrogenation, tending to deteriorate the mechanical strength of the injection foaming product. The number-average molecular weight of the both end blocks is preferably in the range of 25,000 to 630,000, particularly preferably 100,000 to 480,000. In the block copolymer (3), the hydrogenated end blocks have a polymethylene structure.

The intermediate block is preferably a conjugated diene polymer block in which the content of the conjugated diene unit is 50 mass % or more, particularly 60 mass % or more. The conjugated diene may be used 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, chloroprene and the like. Among these, 1,3-butadiene, isoprene, 1,3-pentadiene and the like are preferred, and 1,3-butadiene is particularly preferred. The conjugated diene may be used alone or in combination of two or more.

The content of the 1,2-vinyl bond of the intermediate block is preferably 25 mol % or more, more preferably 25 to 90 mol % and particularly preferably 25 to 85 mol %. The content less than 25 mol % tends to reduce the flexibility of the injection foaming product. The number-average molecular weight of the intermediate block is preferably in the range of 5,000 to 665,000, particularly preferably 20,000 to 540,000.

In case the intermediate block includes a vinyl aromatic unit, the content of such monomer unit is preferably 35 mass % or less, more preferably 30 mass % or less and particularly preferably 25 mass % or less, based on 100 mass % of total of the intermediate block. The vinyl aromatic unit makes a glass transition temperature of the block copolymer (3) higher, tending to deteriorate low-temperature characteristics of the obtained thermoplastic elastomer composition and flexibility of the injection foaming product. The intermediate block has a structure similar to rubber-like ethylene.butene-1 copolymer or vinyl aromatic compound.ethylene.butene-1 copolymer owing to the hydrogenation.

As to the block copolymer (3), it is preferable that double bonds in the block copolymer prior to hydrogenation are saturated by at least 80%, particularly 90% and further 95 to 100% by the hydrogenation. A large amount of the double bonds remaining in the block copolymer (3) tends to deteriorate thermal stability and durability of the injection foaming product. Further, the number-average molecular weight of the block copolymer (3) is preferably in the range of 50,000 to 700,000 and particularly preferably 100,000 to 600,000. The number-average molecular weight less than 50,000 may reduce heat resistance, mechanical strength and the like of the injection foaming product, while the value exceeding 700,000 may reduce fluidity and processability of the obtained thermoplastic elastomer composition. The block copolymer (3) usable in the present invention can be prepared by a method disclosed in JP-A-H3-1289576.

The block copolymer (3) may be a connected block copolymer of a plural block copolymers (3) by a coupling agent residue. For example, by representing the end block by "A" and the intermediate block by "B", it can be [A-B-A-X]n-(A-B-A) (wherein n is an integer from 2 to 4, and X represents a coupling agent residue). In case the coupling agent residue has a molecular weight which is sufficiently small in comparison with the molecular weight of each block and does not affect the crystallinity of the block copolymer (3), it can also be [A-B-X]n-(B-A) (wherein n is an integer from 2 to 4, and X represents a coupling agent residue). Thus, by omitting the relatively small coupling agent residue, it can be [A-B]n-A.

The coupling agent may be used diethyl adipate, divinylbenzene, tetrachloro silicon, butyltrichloro silicon, tetrachloro tin, butyltrichloro tin, dimethylchloro silicon, tetrachloro germanium, 1,2-dibromoethane, 1,4-chloromethylbenzene, bis(trichlorosilyl)ethane, epoxylated linseed oil, trilene diisocyanate, 1,2,4-benzenetriisocyanate and the like.

The block copolymer (3) may also be a modified hydrogenated block copolymer with a functional group. Such functional group may be a carboxyl group, an acid anhydride group, a hydroxyl group, an epoxy group, a halogen atom, an amino group, an isocyanate group, a sulfonyl group or a sulfonate group. The modifying can be executed by a well known method. The content of the function group in the modified block copolymer is preferably from 0.01 to 10 mol %, more preferably from 0.1 to 8 mol %, particularly preferably from 0.15 to 5 mol % based on 100 mol % of total monomer units constituting the polymer.

A preferable monomer for introducing such functional group may be used acrylic acid, methacrylic acid, itaconic acid, maleic acid, maleic anhydride, glycidyl acrylate, glycidyl methacrylate, allyl glycidyl ether, hydroxyethyl methacrylate, hydroxypropyl methacrylate, hydroxyethyl acrylate, hydroxypropyl acrylate, dimethylaminoethyl methacrylate and the like.

As to the contents of the EAO-based copolymer (1), the crystalline polyethylene-based resin (2) and the block copolymer (3) based on 100 mass % of total of these, the content of the EAO-based copolymer (1) is preferably in the range from 10 to 94 mass %, more preferably from 20 to 94 mass %, further preferably from 25 to 94 mass %, particularly preferably from 40 to 94 mass % and most preferably from 50 to 94 mass %. The content of the crystalline polyethylene-based resin (2) is preferably in the range from 5 to 80 mass %, more preferably from 5 to 50 mass % and particularly preferably from 5 to 30 mass %, and the content of the block copolymer (3) is preferably in the range from 1 to 80 mass %, more preferably from 2 to 50 mass % and particularly preferably from 3 to 30 mass %.

The content of the EAO-based copolymer (1) less than 10 mass % may reduce the elastic recovery property of the injection foaming product, while the content exceeding 94 mass % tends to undesirably deteriorate the processability of the obtained thermoplastic elastomer composition. Also the content of the crystalline polyethylene-based resin (2) less than 5 mass % may reduce the elastic recovery property while the content exceeding 80 mass % tends to undesirably deteriorate the elasticity. Further, the content of the block copolymer (3) less than 1 mass % may lower the elastic recovery property of the injection foaming product, while the content exceeding 80 mass % tends to undesirably deteriorate the processability of the obtained thermoplastic elastomer composition.

A particularly stable three-dimensional network structure can be formed in case, the EAO-based copolymer (1) is contained in the range from 40 to 94 mass %, particularly from 50 to 94 mass %, and the crystalline polyethylene-based resin (2) and the block copolymer (3) are contained in a summed amount preferably in the range from 6 to 60 mass %, particularly from 6 to 50 mass % based on 100 mass % of these three components, and the crystalline polyethylene-based resin (2) is contained in the range from 20 to 80 mass %, particularly from 30 to 70 mass % based on 100 mass % of total of the crystalline polyethylene-based resin (2) and the block copolymer (3).

The crystalline ethylene copolymer block (A) at both ends in the block copolymer (3) functions as a block having a high compatibility with the crystalline polyethylene-based resin (2), and the intermediate block (B) formed by the conjugated diene polymer functions as a block having a high compatibility with the EAO-based copolymer (1).

The thermoplastic elastomer according to the present invention includes the above-mentioned ethylene•α-olefin-based copolymer (1) and the above-mentioned crystalline polyethylene-based resin (2). Other additives may be included according to the necessity.

The thermoplastic elastomer according to the present invention has a melt flow rate, measured under conditions at a temperature of 230° C. and a load of 10 kg, of 5 g/10 min or more, preferably 10 g/10 min or more, and particularly preferably 15 g/10 min (usually 200 g/10 min or lower). The melt flow rate less than 5 g/10 min results in an insufficient fluidity at the injection of the obtained thermoplastic elastomer composition, and a failure in filling results particularly in a product with a long flow distance. Also the thermoplastic elastomer has a melt tension, measured at a temperature of 210° C. and a pulling rate of 2 m/min, of 3.0 gf or more, preferably 3.5 gf or more and particularly preferably 4.0 gf or more (usually 12.0 gf or lower). The melt tension less than 3.0 gf results in a breakage of cell membrane at the core-back foaming operation to form open cells, thereby generating a large cavity in the interior of the injection foaming product and providing a product inferior in cushioning property.

In addition, the thermoplastic elastomer has a JIS-A hardness in a solid molded article preferably in the range of 50 to 90, particularly preferably 55 to 80. The hardness less than 50 results in an excessively soft surface in the injection foaming product, thus easily causing scars. On the other hand, the hardness exceeding 90 tends to reduce the flexibility and the elastic recovery property.

The above-mentioned "blowing agent (4)" may be used an organic blowing agent (4a) such as a thermal decomposition type blowing agent, an evaporation type blowing agent, a hollow particle type blowing agent, or an inorganic blowing agent (4b). These forming agents are preferably selected according to the producing method of the injection foaming product. The blowing agent may be used in one kind alone, or, two or more kinds may be used in combination as long as an injection foaming product having predetermined appearance, physical properties and the like can be obtained.

The thermal decomposition type organic blowing agent (4a) may be used a nitroso-based blowing agent such as N,N'-dinitrosopentamethylene tetramine and N,N'-dimethyl-N,N'-dinitrosoterephthalamide; an azo-based blowing agent such as azodicarbonamide, barium azodicarboxylate and barium azodicarboxylate; a sulfonyl hydrazide-based blowing agent such as p,p-oxybisbenzene sulfonyl hydrazide, 4,4'-oxybis(benzenesulfonyl hydrazide) and p-toluenesulfonyl semicarbazide; a triazine-based blowing agent such as trihydrazinotriazine; a tetrazole-based blowing agent such as 5-phenyltetrazole, azobistetrazole guanidine and azobistetrazole aminoguanidine and the like.

The evaporation type organic blowing agent (4A) may be used an aliphatic hydrocarbon such as propane, butane and pentane; an alicyclic hydrocarbon such as cyclobutane, cyclopentane and cyclohexane; a halogenated hydrocarbon such as chlorodifluoromethane, difluoromethane, trifluoromethane, trichlorofluoromethane, dichloromethane, dichlorofluoromethane, dichlorodifluoromethane, trichlorofluoromethane, chloromethane, chloroethane, dichlorotrifluoroethane, dichlorofluoroethane, chlorodifluoroethane, dichloropentafluoroethane, pentafluoroethane, trifluoroethane, dichlorotetrafluoroethane, trichlorotrifluoroethane, tetrachlorodifluoroethane, chloropentafluoroethane and perfluorocyclobutane; carbon dioxide, nitrogen, air and the like; and water and the like.

The hollow particle type organic blowing agent (4a) is a thermally expandable microsphere, having an outer shell of a thermoplastic resin, and an expanding agent contained therein. The expanding agent may be used one similar to the blowing agent of evaporation type. The amount of the expanding agent is preferably 5 to 30 mass % based on 100 mass % of the organic blowing agent (4a). The thermoplastic resin constituting the outer shell may be a polymerized or copolymerized substance of (meth)acrylonitrile, (meth)acrylate, halogenated vinyl, halogenated vinylidene, a styrenic compound, vinyl acetate, butadiene, chloroprene, vinylpyridine and the like.

In addition, the thermoplastic resin constituting the outer shell may be crosslinked with divinylbenzene, ethylene glycol (meth)acrylate, triethylene glycol di(meth)acrylate, trimethylol propane tri(meth)acrylate, 1,3-butylene glycol di(meth)acrylate, allyl(meth)acrylate, triacrylformal, triallyl isocyanurate and the like. The hollow particle type blowing agent generally has a mass-average particle size of 1 to 100 μm before expansion.

However the content of the organic blowing agent (4a) may be selected according to the type of the blowing agent, a predetermined expansion ratio and the like, and is preferably 0.1 to 10 parts by mass, particularly preferably 0.5 to 5 parts by mass, based on 100 parts by mass of total amount of the polymer component contained in the thermoplastic elastomer according to the invention.

The inorganic blowing agent (4b) may be used an inorganic compound such as sodium hydrogencarbonate, ammonium hydrogencarbonate, ammonium chloride, ammonium carbonate and the like which are blowing agents of thermal decomposition type. However the content of the inorganic blowing agent (4b) may be selected according to the type of the blowing agent, a predetermined expansion ratio and the like, and is preferably 0.1 to 10 parts by mass, particularly preferably 0.5 to 5 parts by mass based on 100 parts by mass of total amount of the polymer component contained in the thermoplastic elastomer composition of the invention.

In case the organic blowing agent (4a) and the inorganic blowing agent (4b) are used in combination, the content ratio (4a)/(4b) thereof is preferably 5 to 50/95 to 5, particularly preferably 5 to 20/95 to 80 based on 100 mass % of total of the organic blowing agent (4a) and the inorganic blowing agent (4b).

When the above-mentioned inorganic blowing agent (4b) is used, it is preferable to further add a weakly acidic compound to the present composition. Adding such weakly acidic compound makes the rate of decomposition faster. The weakly acidic compound may be an organic acid such as oxalic acid, malonic acid, citric acid and lactic acid, an inorganic acid such as boric acid, and an acidic salt such as monosodium citrate and acidic potassium tartrate, and particularly preferred are citric acid and monosodium citrate. These may be used alone or in combination of two or more.

The amount to be added of the weakly acidic compound is preferably 10 to 60 parts by mass, particularly preferably 25 to 50 parts by mass based on 100 parts by mass of the inorganic blowing agent (4b).

Although the organic blowing agent (4a) can easily provide an injection foaming product of a high magnification, an odor may remain in the injection foaming product. On the other hand, the inorganic blowing agent (4b) scarcely leads to odor and is preferable in an application in which the odor is not desired for example for an internal part of an automobile. In addition, a combined use with the inorganic blowing agent (4b) can reduce the content of the organic blowing agent (4a) and can advantageously reduce the odor.

As the above-mentioned "nucleating agent (5)", a powder of an inorganic compound such as calcium carbonate, talc, mica, silica and titania can be used. Containing such a nucleating agent leads to easy adjustment of the cell diameter, thereby providing an injection foaming product for example having an adequate flexibility. The particle size of the nucleating agent is not particularly limited, but is preferably 2 to 50 μm, particularly preferably 5 to 20 μm. The particle size less than 2 μm undesirably leads to a large cell diameter of the obtained injection foaming product and an effect of the nucleating agent is difficult to obtain. On the other hand, the particle size exceeding 50 μm undesirably leads to a coarse and large cell and fewer cells in number, whereby the injection foaming product becomes excessively soft and inferior in cushioning property. The content of the nucleating agent is preferably 0.01 to 3 parts by mass, more preferably 0.05 to 2 parts by mass and particularly preferably 0.1 to 1 part by mass based on 100 parts by mass of total amount of the polymer component contained in the thermoplastic elastomer composition of the present invention.

As the nucleating agent (5), a product generated by decomposition of the inorganic blowing agent (4b) can also be used. When the organic blowing agent (4a) and the inorganic blowing agent (4b) are used in combination, the inorganic blowing agent (4b) decomposes at first, and, in case of using for example sodium hydrogencarbonate, sodium carbonate and the like are generated after decomposition. Such decomposition product functions as a nucleating agent at the decomposition of the organic blowing agent (4a). Therefore, without nucleating agents it leads to an injection foaming product having an adequate cell diameter, and being soft and superior in cushioning property.

The thermoplastic elastomer composition of the present invention may further include other polymers. For example, as a resin component, a crystalline polymer of an α-olefin having 3 or more carbon atoms may be used. Containing the other polymers makes surface of the injection foaming product smoother. Such crystalline α-olefin polymer may be used polypropylene, polybutene-1, poly-4-methyl-pentene-1, polyhexene-1, a propylene.ethylene copolymer, a propylene-butene-1 copolymer and the like. These may be used alone or in combination of two or more.

The content of the crystalline α-olefin polymer is preferably 10 parts by mass or less, more preferably 5 parts by mass or less and particularly preferably 4 parts by mass or less based on 100 parts by mass of total of the EAO-based copolymer (1), the crystalline polyethylene-based resin (2) and the block copolymer (3). The content exceeding 10 parts by mass may not form a stable three-dimensional network structure.

The thermoplastic elastomer composition of the present invention may further include a mineral oil type softening agent. The mineral oil type softening agent may be used a mineral oil such as naphthene-based and paraffin-based, and the like. Adding such softening agent makes the processability of the obtained thermoplastic elastomer composition improved. The amount of the mineral oil type softening agent is usually 200 parts by mass or less, preferably 100 parts by mass or less, and more preferably 50 parts by mass or less based on 100 parts by mass of total of the EAO-based copolymer (1), the crystalline polyethylene-based resin (2) and the block copolymer (3). A method and a process for adding the mineral oil type softening agent are not particularly limited.

The thermoplastic elastomer composition for core-back system foam injection molding of the present invention can be produced by supplying the EAO-based copolymer (1), the crystalline polyethylene-based resin (2) and eventually the block copolymer (3) to a closed type kneader such as Banbury mixer and a pressure kneader, a roll mill, a single screw extruder, a twin screw extruder, a kneading extruder and the like adjusted to a predetermined temperature for kneading therein, kneading them to prepare a thermoplastic elastomer preferably in a pellet shape, then supplying the thermoplastic elastomer, the blowing agent (4) and the nucleating agent (5) to an injection molding machine and kneading all. Kneading temperature for preparing the thermoplastic elastomer is preferably a temperature at which at least the block copolymer (3) is molten, and may normally be in the range between 120 and 280° C. Kneading time may be selected depending on the employed apparatus and the kneading temperature, and is preferably from 10 seconds to 60 minutes, preferably 30 seconds to 30 minutes.

It is preferred that the blowing agent (4) and the nucleating agent (5) are respectively kneaded in advance in an olefin resin (6) to prepare a blowing agent-containing resin or a nucleating agent-containing resin, and then added to the EAO-based copolymer (1), the crystalline polyethylene-based resin (2) and eventually the block copolymer (3). Such manner leads to a thermoplastic elastomer composition which the blowing agent and the nucleating agent is more uniformly dispersed therein.

The olefin resin (6) may be used a resin principally contained an ethylene unit, a resin principally contained a propylene unit, an ethylene-propylene copolymer and the like. Each of these resins may be crystalline or amorphous, or may be the same as the resin used as the crystalline polyethylene-based resin (2). In addition, the olefin resin (6) used with the blowing agent and the olefin resin (6) used with the nucleating agent may be same or different. The olefin resin (6) contained in the thermoplastic elastomer composition of the present invention may form a matrix or a three-dimensional network structure accompanied by the crystallinity thereof. Further, since the olefin resin (6) is present in a small amount, a specified structure of the thermoplastic elastomer composition composed of a matrix and a three-dimensional network structure, is not destructed.

Taking the blowing agent-containing resin as 100 mass %, the content of the blowing agent is preferably 10 to 60 mass %, particularly preferably 20 to 50 mass %. Also taking the nucleating agent-containing resinous material as 100 mass %, the content of the nucleating agent is preferably 2 to 20 mass %, particularly preferably 5 to 15 mass %. Even in case the contents of the blowing agent and the nucleating agent are small, they can be uniformly dispersed by preparing such resinous material of a high concentration, or so-called master batch, and adding such master batch in such a manner that the blowing agent or the nucleating agent becomes a predetermined amount.

The thermoplastic elastomer composition of the present invention may further include various additives according to the necessity, such as a lubricant, an anti-aging agent, a thermal stabilizing agent, a light resistant agent such as HALS, a weather resistant agent, a metal deactivator, an ultraviolet absorber, a light stabilizer, a stabilizer such as a copper poisoning preventing agent, an antibacterial agent, an antifungal agent, a dispersant, a plasticizer, a flame retardant, a tackifier, a colorant such as titanium oxide, carbon black and an organic pigment, a metal powder such as ferrite, glass fibers, inorganic fibers such as metal fibers, carbon fibers, organic fibers such as aramide fibers, composite fibers, inorganic whiskers such as potassium titanate whiskers, a filler such as glass beads, glass baloons, glass flakes, asbestos, mica, calcium carbonate, talc, silica, calcium silicate, hydrotalcite, kaolin, diatomaceous earth, graphite, pumice, ebo powder, cotton flock, cork powder, barium sulfate, fluorinated resin, polymer beads, polyolefin wax, cellulose powder, rubber powder and wood powder or mixture thereof, a rubber such as isobutylene-isoprene copolymer and silicone rubber, a thermoplastic resin such as ethylene.vinyl acetate copolymer and ABS resin, and the like.

The foam injection molding method of the present invention leads to an injection foaming product by so-called coreback type injection molding method in which the above-mentioned thermoplastic elastomer composition for foam injection molding is injected into a cavity space formed in a metal mold of an injection molding apparatus, and, immediately or after the lapse of a predetermined time, a movable mold or a movable core provided in the movable mold is retracted with a predetermined rate to a predetermined position to expand the cavity space, thereby achieving foaming. Since the metal mold usually has a temperature considerably lower than the temperature of the thermoplastic elastomer composition during injection, a dense skin layer with scarce foaming is formed at the surface of the injection foaming product, formed in contact with the surface of the cavity.

The injection foaming product can also be integrally formed in contact with a surface of a base body made of a resin and the like. Such laminated article can be formed by positioning the base body in advance in the cavity space, and injecting the thermoplastic elastomer composition to the surface of the base body. In addition, another laminated article in which the injection foaming product is laminated on the surface of the base body can be formed by injecting a resin for constituting a base body to form the base body at first, then forming a cavity space for injecting the thermoplastic elastomer composition by retracting a movable core provided in a movable mold, injecting the thermoplastic elastomer composition, expanding the cavity space by further retracting the movable core, and then foaming with an injection molding apparatus having two injection units.

In the foam injection molding method of the present invention, an "mold opening rate" which is a retracting rate of the movable mold, or a retracting rate of the movable core provided in the movable mold is in the range of 0.05 to 0.4 mm/sec. The mold opening rate is preferably 0.1 to 0.4 mm/sec, more preferably 0.1 to 0.3 mm/sec. Such mold opening rate leads to a uniform injection foaming product, which has an adequately fine average cell diameter of 200 μm or less, particularly 50 to 150 μm, and whose difference between an average cell diameter (Dg) in the vicinity of the gate and an average cell diameter (De) in an end portion is small [(Dg/De) being 0.65 or higher, particularly 0.7 or higher (usually not exceeding 1.2)].

The mold opening rate less than 0.05 mm/sec leads to an insufficient foaming because cooling proceeds, thereby forming irregularities on the surface. On the other hand, the mold opening rate exceeding 0.4 mm/sec leads to a large cell diameter and an excessive flexibility, whereby an injection foaming product having satisfactory cushioning property and the like cannot be obtained. Also the cell diameter becomes uneven, and the injection foaming product shows a significant difference in the cell diameter between the vicinity of the gate and the end portion.

The temperature of the injected thermoplastic elastomer composition is preferably in the range between 180 and 250° C., particularly preferably between 190 and 220° C. The temperature less than 180° C. leads to an insufficient fluidity of the thermoplastic elastomer composition, and a filling failure in the end portion. On the other hand, the temperature exceeding 250° C. may cause a thermal deterioration depending on the composition of the thermoplastic elastomer composition. In addition, the temperature of the metal mold is preferably in the range between 20 and 60° C., particularly preferably between 30 and 50° C. The temperature less than 20° C. may make the thermoplastic elastomer composition coming into contact with the internal surface of the metal mold cool rapidly, and not lead to a uniform injection foaming product and further filling failure may result in the end portion. On the other hand, the temperature exceeding 60° C. may undesirably lead to an injection foaming product having a not uniform skin layer at a portion formed in contact with the surface of the cavity thereof.

In addition, a time from the injection of the thermoplastic elastomer composition to the start of retraction of the movable mold or the movable core provided in the movable mold (metal mold retraction delay time) may be selected depending on the mold opening rate, and is preferably 5 seconds or less, and the retraction may be started immediately after the completion of injection. The metal mold retraction delay time is preferably 0.5 to 3 seconds, particularly preferably 0.5 to 1.5 seconds. In case the metal mold retraction delay time exceeds 5 seconds, a uniform injection foaming product may not be obtained as the cooling proceeds.

An amount of retraction of the metal mold can be set according to a predetermined expansion ratio and is not limited. Retracting the metal mold, namely opening the mold is preferable so as to set a final thickness of the injection foaming product 1.1 to 5.0 times of an initial thickness of the material filled in the cavity space of the metal mold for an internal part for an automobile and the like. An expansion ratio, represented by such thickness ratio, is preferably 1.3 to 3 times, more preferably 1.5 to 2 times. And in consideration of a fact that most of the injection foaming products have a thickness in the range from 2 to 10 mm and particularly from 3 to 6 mm, the amount of retraction of the metal mold is usually 0.5 to 4 mm.

A cooling time is depending on the dimension of the injection foaming product or a cooling method, and is only required that the injection foaming product at releasing from the mold is cooled to a temperature in the range between about 40 and 80° C., and can generally be 30 seconds or longer, and 100 seconds are sufficient even for a large article.

BEST MODE FOR CARRYING OUT THE INVENTION

In the following, the present invention will be explained in further details by examples and comparative example for producing a glove box lid which is an internal part of an automobile.

[1] Production of Thermoplastic Elastomer Compositions for Core-Back System Foam Injection Molding

EXAMPLE 1-1

Following components <1> to <5> were employed by a following mass ratio, melted and kneaded in a pressurized kneader (manufactured by Moriyama Co., Ltd.) of a capacity of 10 liters under conditions of a set temperature of 150° C., a kneading time of 15 minutes, and revolutions of rotors of 32 rpm (front side) and 28 rpm (rear side) and were pelletized by a feeder-ruder (manufactured by Moriyama Co., Ltd.) as a thermoplastic elastomer for producing an injection foaming product. Then the pellets were used in an injection molding machine (manufactured by Toshiba Kikai Co., Ltd., model "IS-90B") to mold a sheet of a thickness of 2 mm, which was observed under a transmission electron microscope. The sheet was also used for measuring a JIS-A hardness.

Figure 1:
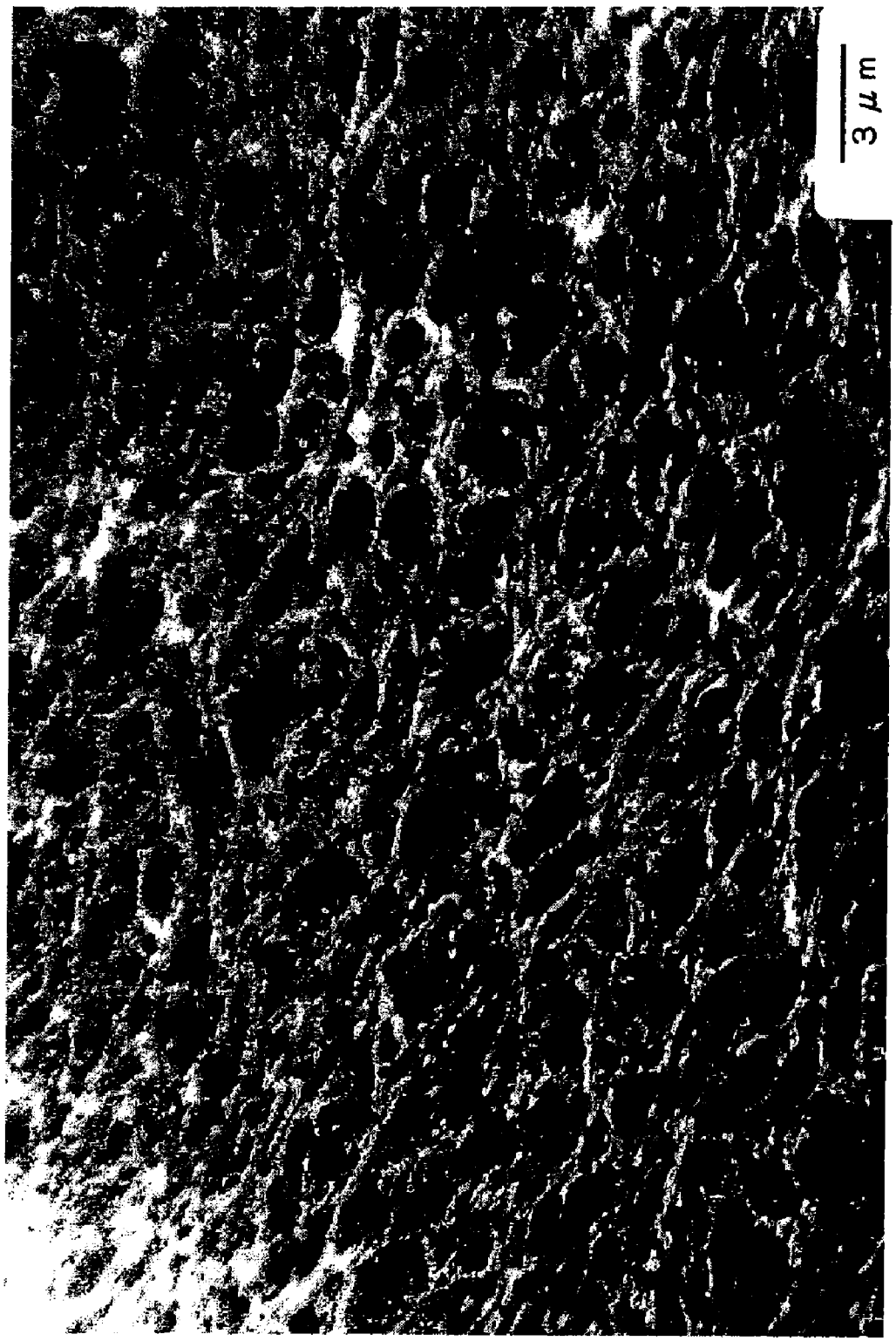
FIG. 1 is an explanatory view showing a magnified photograph of 2000 times of a sheet formed by injection molding of a thermoplastic elastomer composition for core-back system foam injection molding of Example 1-1.

The sheet observation was executed by slicing the sheet into a thin flake with a microtome along the planar direction, dyeing the flake with $RuO_4$ or the like and observing under a transmission electron microscope. In FIG. 1 which is an explanatory view by a magnified photograph of 2000 times, it is clearly indicated that a three-dimensional network structure was formed. Also the thermoplastic elastomer of this Example 1-1 had a melt flow rate (MFR) of 16 g/10 min measured by a method to be explained described below, a melt tension of 6.7 gf and a JIS-A hardness of 67.

(1) Components and Amounts Used

<1> EAO-based copolymer (1): ethylene.propylene.5-ethylidene-2-norbornene terpolymer (ethylene content; 66 mass %, 5-ethylidene-2-norbornene content; 4.5 mass %, $ML_{1+4}$ (100° C.)=400, containing 50 mass % of a mineral oil type softening agent (manufactured by Idemitsu Kosan Co. Ltd., trade name "Diana Process Oil PW380") to an oil extended), amount used; 58 parts by mass, <2> Crystalline polyethylene-based resin (2): linear low-density polyethylene (density; 0.925 g/cm$^3$, MFR (temperature 190° C., load 2.16 kg); 0.8 g/10 min, manufactured by Japan Polychem Corp., trade name "Novatek LLPDE UF423"), amount used; 17 parts by mass, <3> Block copolymer (3): a hydrogenated diene copolymer described in Table 1, amount used; 20 parts by mass, <4> Crystalline α-olefin copolymer: propylene.ethylene block copolymer (density; 0.90 g/cm$^3$, MFR (temperature 230° C., load 2.16 kg); 3 g/10 min, manufactured by Japan Polychem Corp., trade name "Novatek PP BC5CW"), amount used; 5 parts by mass, and <5> Anti-aging agent: manufactured by Ciba Specialty Chemicals Co. Ltd., trade name "IRGANOX 1010", amount used; 0.2 parts by mass, wherein a sum of <1>, <2>, <3> and <4> is taken as 100 parts by mass.

TABLE 1

|  | Hydrogenated diene-based copolymer* |
|---|---|
| Block structure | A-B-A |
| Polymer structure before hydrogenation |  |
| Block A (whole) |  |
| 1,2-vinyl bond content (%) | 15 |
| block A content (%) | 30 |
| Block B |  |
| 1,2-vinyl bond content (%) | 80 |
| block B content (%) | 70 |
| Number-average molecular weight (×10$^4$) | 24 |
| Hydrogenation rate (%) | 98 |

*Polymer employing 1,3-butadiene as monomer.

A blowing agent and a nucleating agent were used as a separate master batch prepared as described below and added to the injection molding machine together with the prepared thermoplastic elastomer above. In this manner a thermoplastic elastomer composition for core-back system foam injection molding was obtained.

A blowing agent-containing master batch (low-density polyethylene, trade name "Polythlene EE405" manufactured by Eiwa Chemical Ind. Co., Ltd. containing sodium hydrogencarbonate as an inorganic blowing agent and citric acid in a total amount of 40 mass %) and a nucleating agent-containing master batch (low-density polyethylene containing calcium carbonate powder in 8 mass %) were mixed in equal amounts in a mass ratio to prepare a master batch containing the blowing agent and the nucleating agent, which was pelletized in a similar manner as in the above-mentioned thermoplastic elastomer.

(2) Evaluation Method for Physical Properties

<1> Melt flow rate (MFR); measured according to JIS K7210 under conditions of a temperature of 230° C. and a load of 10 kg.

<2> Melt tension; measured with a melt tension tester (manufactured by Toyo Seiki Seisaku-Sho, Ltd., model "Melt Tension Tester II") under conditions of a temperature of 210° C., an extrusion rate of 10 mm/min, and an extracting rate of 2 m/min).

<3> JIS-A hardness; A sample piece was prepared by punching a sheet into a predetermined shape with a dumbbell cutter and was measured according to JIS K6301.

EXAMPLE 1-2

A thermoplastic elastomer for core-back system foam injection molding was obtained in a similar manner as Example 1-1 except that a blowing agent-containing master batch (low-density polyethylene, trade name "Polythlene EV309" manufactured by Eiwa Chemical Ind. Co., Ltd. containing azodicarbonamide as an organic blowing agent in an amount of 30 mass %) and a nucleating agent-containing master batch (low-density polyethylene containing calcium carbonate powder in 6 mass %) were mixed in equal amounts in a mass ratio to prepare a master batch and added.

EXAMPLE 1-3

A thermoplastic elastomer for core-back system foam injection molding was obtained in a similar manner as Example 1-1 except that a blowing agent-containing master batch (low-density polyethylene, trade name "Polythlene EE202H" manufactured by Eiwa Chemical Ind. Co., Ltd. containing azodicarbonamide as an organic blowing agent and sodium hydrogencarbonate as an inorganic blowing agent in a total amount of 20 mass %) was added. Although a nucleating agent was not added in this Example 1-3, sodium carbonate generated from sodium hydrogencarbonate which decomposes precedently acts as the nucleating agent in decomposition of azodicarbonamide which decomposes later on.

EXAMPLE 1-4

Following components <1> to <6> were employed in a predetermined mass ratio to obtain a thermoplastic elastomer composition in the same manner as Example 1-1.

<1> EAO-based copolymer (1): polymer employed in Example 1-1, amount used; 65 parts by mass, <2> Crystalline polyethylene-based resin (2): linear high-density polyethylene (manufactured by Japan Polyolefins Co., Ltd., trade name "KMA90K"), amount used; 10 parts by mass, <3> Block copolymer (3): a hydrogenated diene copolymer described in Table 1, amount used; 10 parts by mass, <4> Crystalline α-olefin copolymer: propylene.ethylene block copolymer employed in Example 1-1, amount used; 10 parts by mass, <5> Mineral oil type softening agent: manufactured by Idemitsu Kosan Co. Ltd., trade name "Diana Process Oil PW380", amount used; 5 parts by mass, and <6> Anti-aging agent: manufactured by Ciba Specialty Chemicals Co. Ltd., trade name "IRGANOX 1010", amount used; 0.2 parts by mass, wherein a sum of <1>, <2>, <3>, <4> and <5> is taken as 100 parts by mass. The obtained thermoplastic elastomer had MFR of 50 g/10 min, a melt tension of 3.4 gf and a JIS-A hardness of 70.

The thermoplastic elastomer was employed in a similar manner as Example 1-1 to obtain a thermoplastic elastomer for core-back system foam injection molding.

COMPARATIVE EXAMPLE 1-1

An inorganic blowing agent and a nucleating agent were added to a partially crosslinked thermoplastic elastomer (manufactured by Sumitomo Chemical Co., Ltd., trade name "TPE 4652") to obtain a thermoplastic elastomer composition in the same manner as Example 1-1. The partially crosslinked thermoplastic elastomer had an MFR of 15 g/10 min, a melt tension of 2.8 gf and a JIS-A hardness of 57, measured in a similar manner as Example 1-1.

COMPARATIVE EXAMPLE 1-2

A thermoplastic elastomer composition was obtained in a similar manner as Example 1-1, except that the nucleating agent-containing master batch was not added but the blowing agent-containing master batch was added in 3.75 parts by mass.

[2] Production of Base Body for Glove Box Lid

A composite material comprising polypropylene (manufacture by Idemitsu Petrochemical Co., Ltd., trade name "Idemitsu Polypropylene J-762HP") containing talc in 10 mass % and ethylene.propylene copolymer rubber in 3 mass % was employed for producing a base body of a thickness of 2.5 mm by injection molding.

[3] Manufacture of Glove Box Lid

Examples 2-1 to 2-4 and Comparative Examples 2-1 and 2-2

100 parts by mass of the pellet of each thermoplastic elastomer of Examples 1-1 to 1-4 and Comparative Examples 1-1 and 1-2 as described in [1] and 7.5 parts by mass of the pellet of the master batch were dry blended and supplied to a hopper of an injection molding machine (manufactured by Toshiba Kikai Co., Ltd., model "IS-280E"), and a glove box lid having a foamed layer (injection foaming product) of a thickness of 4 mm on a surface of the base body produced in [2] was produced in the following manner.

Figure 2:
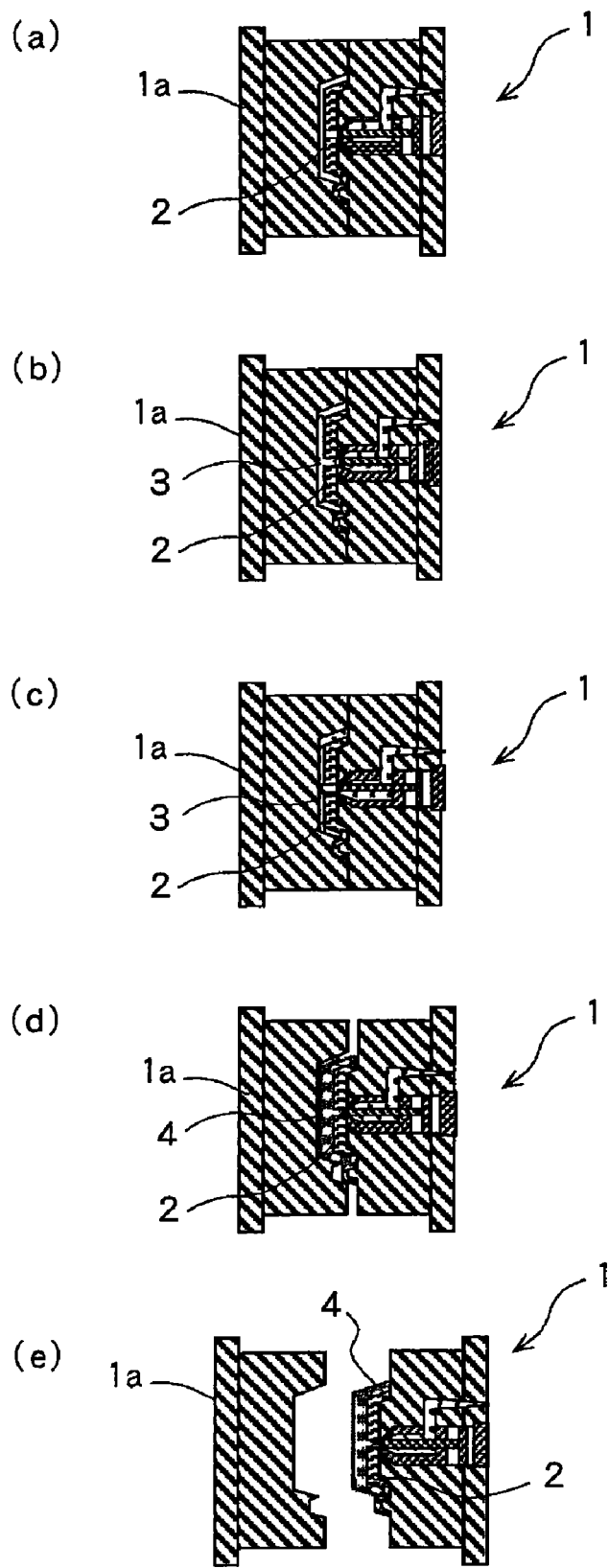
FIG. 2 is a schematic view showing a manufacturing process for a glove box lid, wherein (a) shows a state where a base body is positioned in a cavity space; (b) shows a state in the course of injection; (c) shows a state where the injection is completed; (d) shows a state of foaming by a retraction of a movable mold; and (e) shows a state of mold opening.

In the following, a producing method of the glove box lid is explained with reference to FIG. 2 outlining the process steps.

As shown in FIG. 2(a), a base body 2 was placed in a part of a cavity space of a metal mold 1 which was controlled to 30° C. Then, as shown in FIG. 2(b), a thermoplastic elastomer composition 3 heated at 210° C. was injected in the other space of a thickness of 2 mm without the base body 2 in the cavity space. The injection was completed in 1.5 seconds, and, as shown in FIG. 2(c), the other part of the cavity space was filled with the thermoplastic elastomer composition 3. After 1 second (core-back start time), as shown in FIG. 2(d), a movable mold 1a was retracted by 2 mm (core-back amount) at a rate of 0.3 mm/sec (core-back rate), to foam the thermoplastic elastomer composition, and cooling was executed for 60 seconds in this state. Then, as shown in FIG. 2(e), the mold was opened to obtain a glove box lid constituted by forming a foamed layer 4 of a thickness of 4 mm (corresponding to an expansion ratio of 2 times) on a surface of the base body 2.

COMPARATIVE EXAMPLE 2-3

A glove box lid was obtained in a similar manner as Example 2-1 except that the mold opening rate was changed to 1 mm/sec.

[4] Evaluation of Foamed Layer

Figure 3:
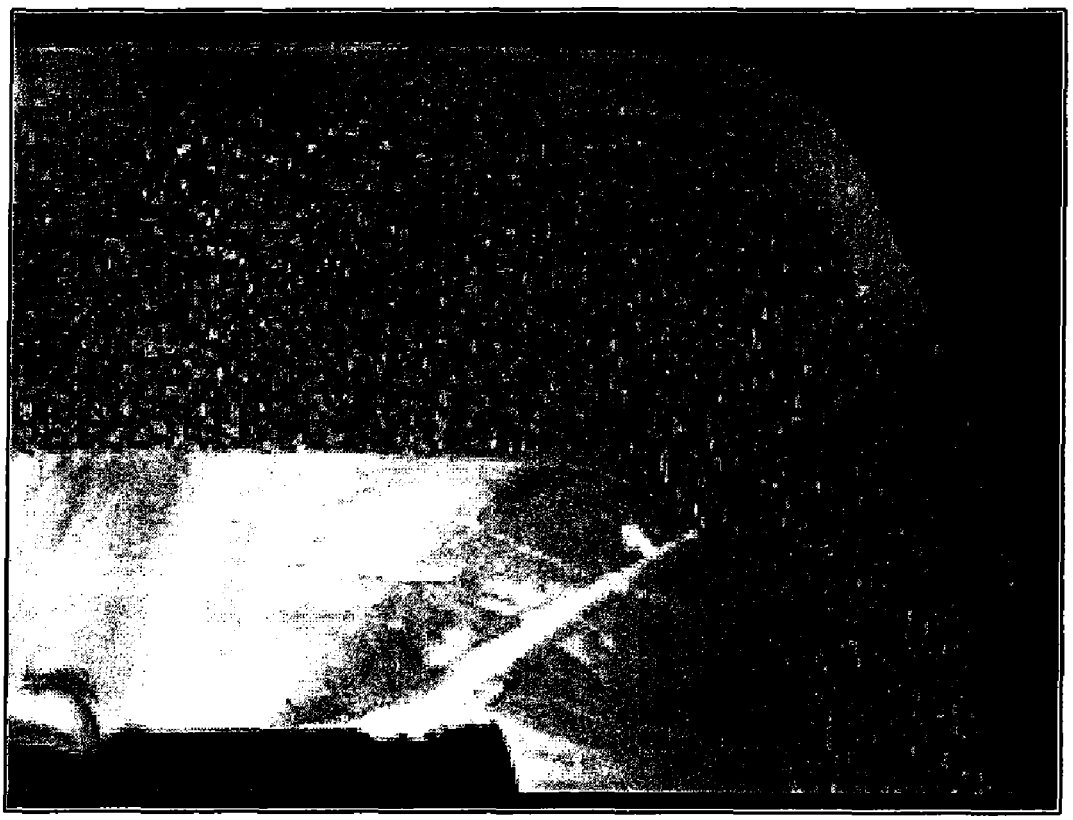
FIG. 3 is an explanatory view showing a microscope magnified photograph of a cross section of the glove box lid obtained in Example 2-1.
Figure 4:
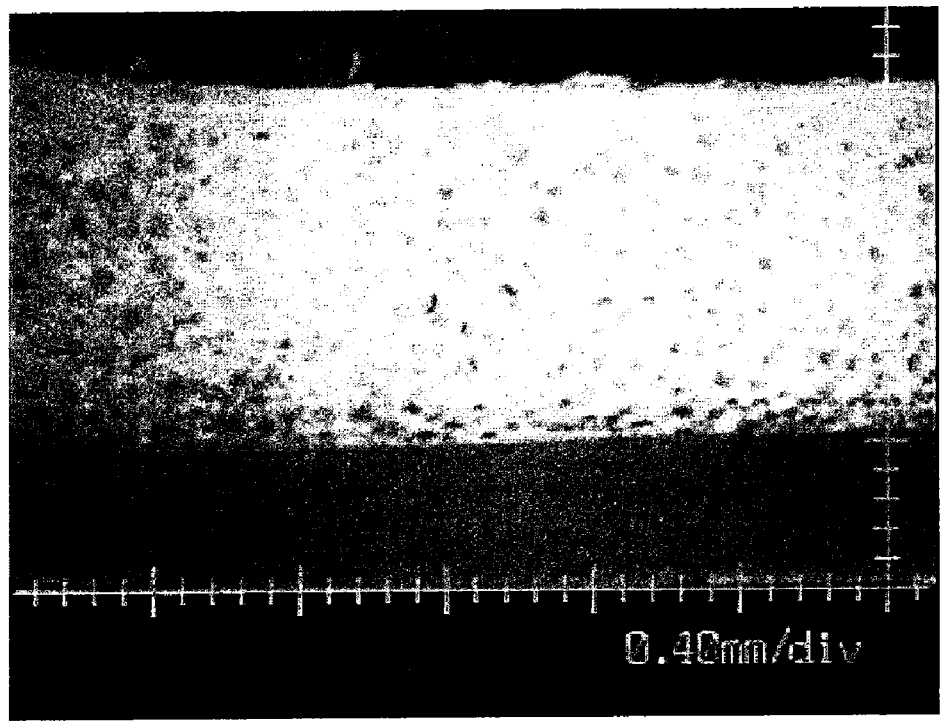
FIG. 4 is an explanatory view showing microscope magnified photographs of a cross section, (a) at the vicinity of a gate and (b) at an end portion, of the glove box lid obtained in Example 2-1.
Figure 4:
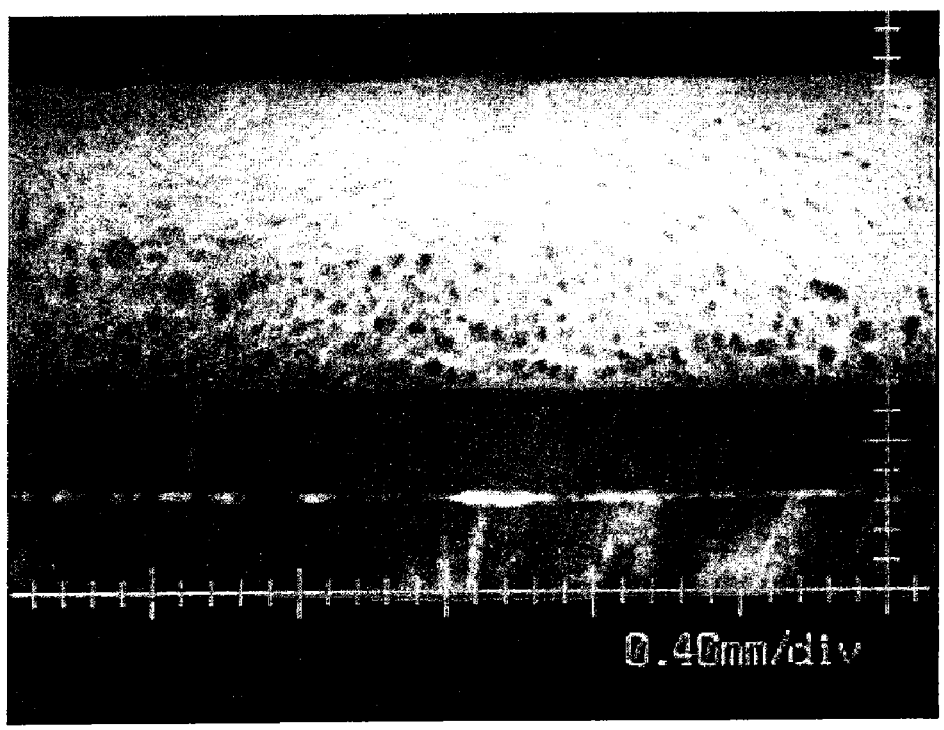

A cross section of the glove box lid produced in [3] was observed with a microscope. As a result, as shown in FIGS. 3 and 4 providing photographic explanatory views, Example 2-1 showed formation of a foamed layer having a small difference in the average cell diameter between a vicinity of the gate and an end portion and including fine cells of a diameter of 200 μm or less. The foamed layer has an average cell diameter (Dg) of 98 μm in the vicinity of the gate and an average cell diameter (De) of 102 μm in the end portion, with (Dg/De) of 0.96.

In addition, Examples 2-2 to 2-4 showed formation of foamed layers having fine cells of a diameter of 200 μm or less. In the foamed layers of Examples 2-2 to 2-4, the cell diameter in the vicinity of the gate was respectively 105, 94 and 98 μm, and the cell diameter at the end was respectively 115, 123 and 118 μm.

Figure 5:
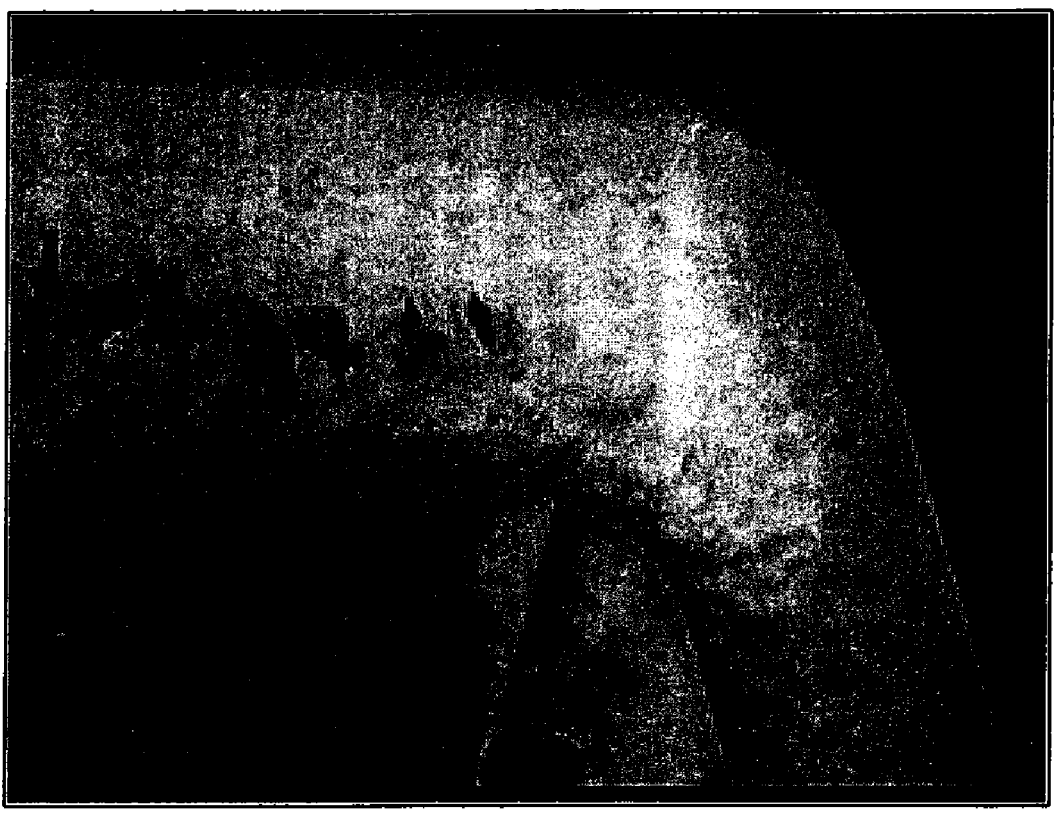
FIG. 5 is an explanatory view showing a microscope magnified photograph of a cross section of the glove box lid obtained in Comparative Example 2-1.
Figure 6:
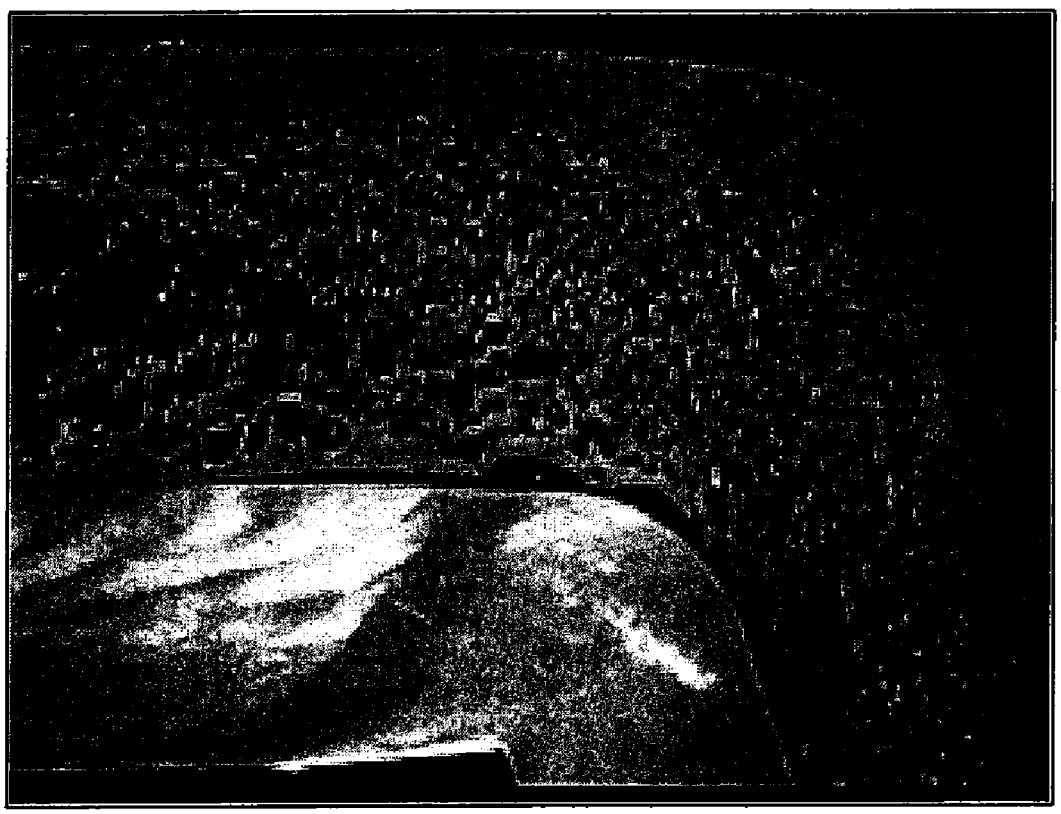
FIG. 6 is an explanatory view showing a microscope magnified photograph of a cross section of the glove box lid obtained in Comparative Example 2-2.

On the other hand, as shown in FIG. 5 providing a photographic explanatory view, Comparative Example 2-1 showed an inhibition of uniform foaming by crosslinking reaction, resulting in coarse gaps or partial cracks. Also as shown in FIG. 6 providing a photographic explanatory view, Comparative Example 2-2 had uneven and coarse cells.

Figure 7:
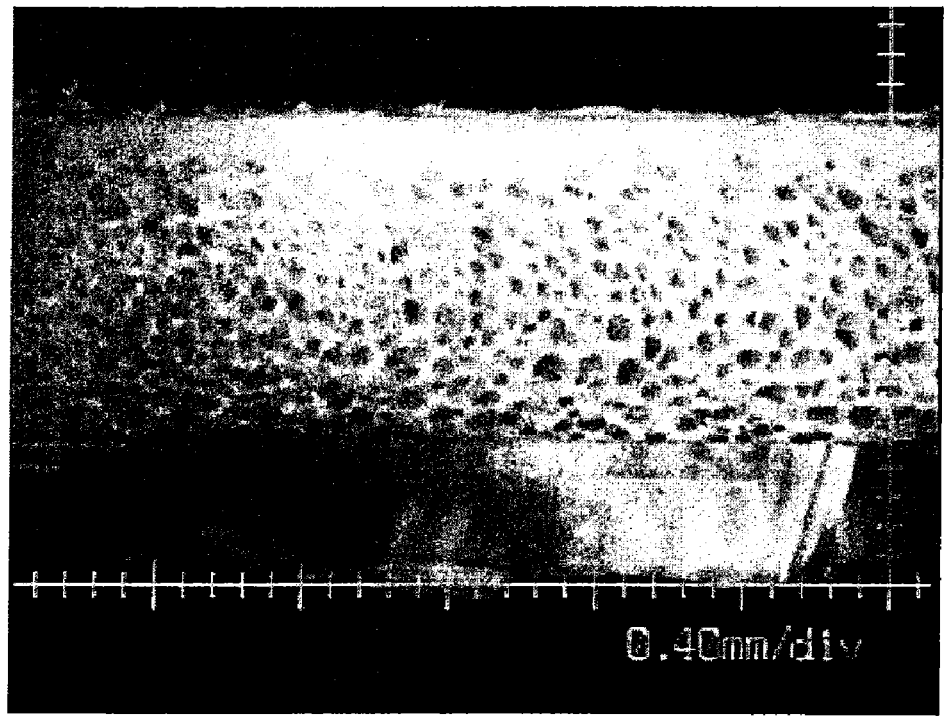
FIG. 7 is an explanatory view showing microscope magnified photographs of a cross section, (a) at the vicinity of a gate and (b) at an end portion, of the glove box lid obtained in Comparative Example 2-3.
Figure 7:
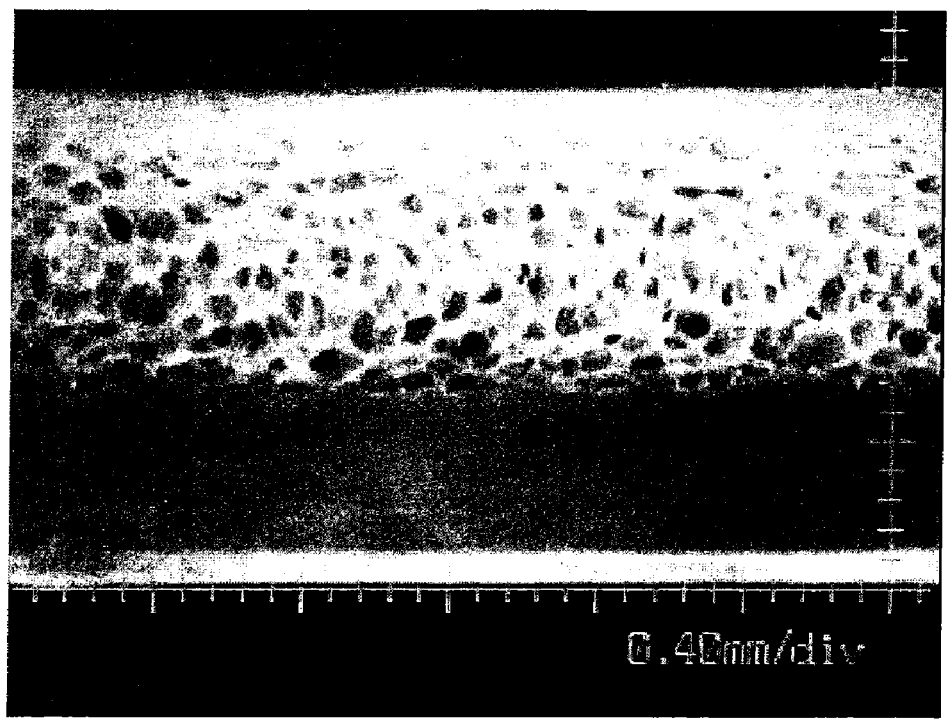

And as shown in FIG. 7 providing a photographic explanatory view, in the glove box lid obtained in Comparative Example 2-3, the cell diameter was generally large and particularly large at the end portion, and the foamed layer had an average cell diameter (Dg) of 210 μm in the vicinity of the gate and an average cell diameter (De) of 345 μm in the end portion, with (Dg/De) of 0.61. Therefore the foamed layer was too soft, and was of a low quality providing a bottom hitting feeling that the base body is impinged.

The present invention is not limited to the foregoing examples but the examples can be modified in various manners within the scope of the present invention. For example, the glove box lid can be produced by a double injection method explained below.

Figure 8:
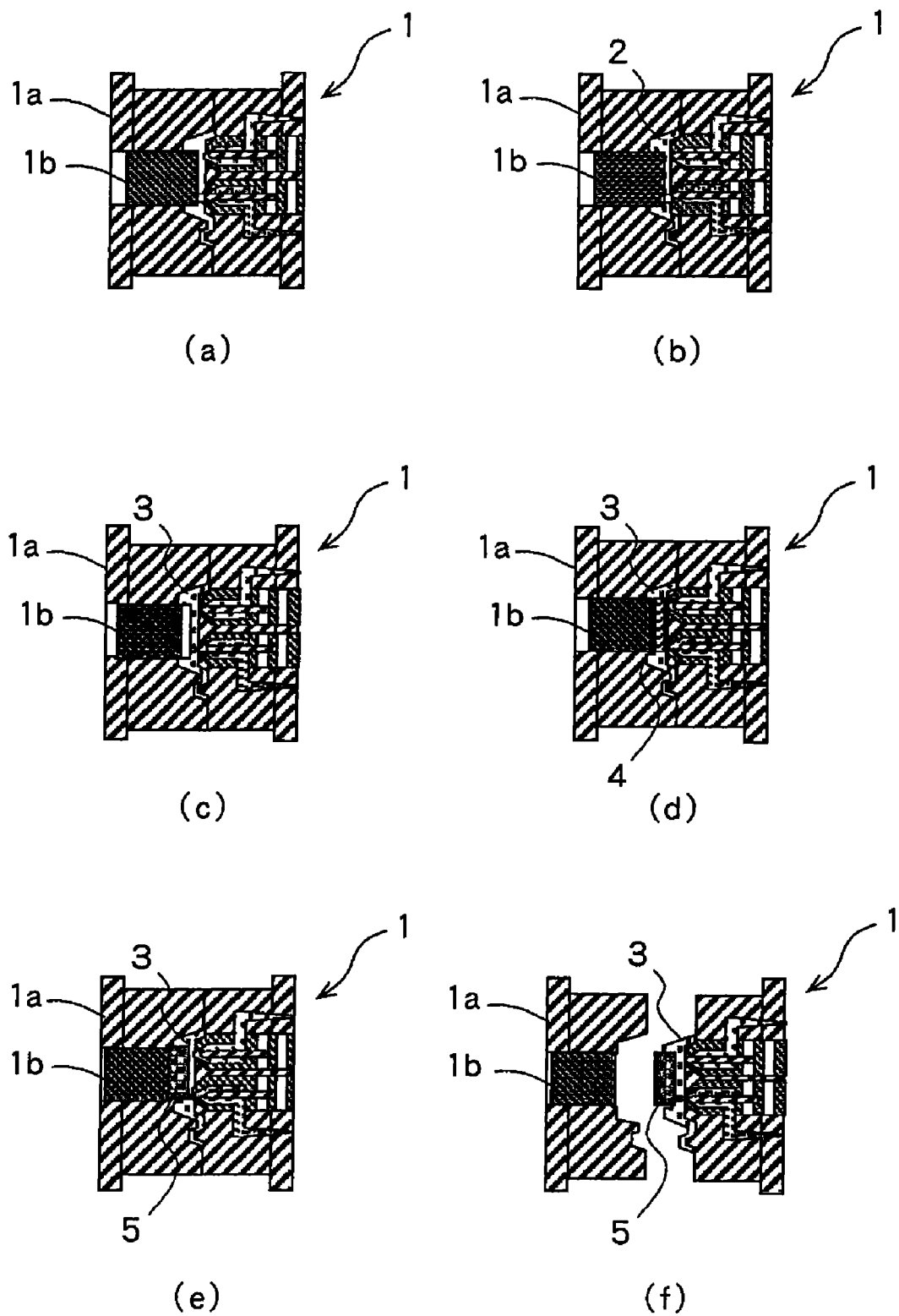
FIG. 8 is an explanatory view showing another manufacturing process for a glove box lid, wherein (a) shows a state prior to the start of the molding; (b) shows a state after an injection of a composite material; (c) shows a state wherein, after the composite material is cooled to form a base body, the movable core is retracted to form a space for injecting a thermoplastic elastomer composition; (d) shows a state where the injection is completed; (e) shows a state of executing foaming by a retraction of the movable core; and (f) shows a state after mold releasing.

As shown in FIG. 8(a), there is prepared a metal mold 1 having a movable mold 1a provided with a movable core 1b. Then, a composite material 2 is injected into a cavity space of the metal mold 1 which is controlled to a suitable temperature, and cooled to form a base body 3 as shown in FIG. 8(b). Next, the movable core 1b is retracted to form a space for injecting a thermoplastic elastomer composition as shown in FIG. 8(c). After that, a thermoplastic elastomer composition 4 of a predetermined temperature is injected into such space as shown in FIG. 8(d). And after a lapse of a predetermined time, the movable core 1b is retracted with a predetermined mold opening rate to foam the thermoplastic elastomer composition and cool in this state as shown in FIG. 8(e). Then, the mold is released to obtain a glove box lid constituted by forming a foamed layer 5 having a predetermined expansion ratio on a surface of the base body 3 as shown in FIG. 8(f).

ADVANTAGE OF THE INVENTION

The thermoplastic elastomer composition for core-back system foam injection molding of the present invention has a three-dimensional network structure not chemically crosslinked, and, since such three-dimensional network structure is disappeared by melting beyond the melting point, there can be obtained a thermoplastic elastomer composition excellent in processability. By employing such thermoplastic elastomer composition, there can provide an injection foaming product having a highly closed cell, a uniform cell shape, a small cell diameter and excellent in elastic recovering property, flexibility and visual appearance.

In addition, when an organic blowing agent and an inorganic blowing agent are used in combination, a product generated by decomposition of the inorganic blowing agent which decomposes at first can be functioned as a nucleating agent, so that a nucleating agent need not be added separately. Further, such combined use leads to reduction of the content of the organic blowing agent which causes a problem of odor remaining in the injection foaming product. Also in case an inorganic blowing agent and a weakly acidic compound are used in combination, a decomposition rate can be increased. A nucleating agent having a particle diameter of 2 to 50 μm can provide an injection foaming product having an adequate cell diameter and excellent in cushioning property and the like.

The foam injection molding method of the present invention, employing a thermoplastic elastomer composition for foam injection molding having a three-dimensional network structure not chemically crosslinked, and which is excellent in processability since such three-dimensional network structure is disappeared by melting beyond the melting point, and executing a core-back system foam injection molding with a specified molding opening rate, can provide an injection foaming product having a highly closed cell, a uniform cell shape, a small cell diameter and excellent in elastic recovering property, flexibility and visual appearance.

In addition, specifying a metal mold retraction delay time and a final thickness of the injection foaming product against an initial thickness of the material filled in the cavity space of the metal mold leads to an injection foaming product having a superior quality. Further employing a weakly acidic compound in combination makes the decomposition rate faster. And also, by forming an injection foaming product on a surface of a base body made of a resin and the like, there can be easily formed an internal part for an automobile and the like constituted by a laminated article comprising the base body and the foamed layer.

What is claimed is:

1. A foam injection molding method comprising:
   injecting a thermoplastic elastomer composition for core-back system foam injection molding into a cavity space in a metal mold, and
   opening said metal mold at a mold opening rate of 0.05 to 0.4 mm/sec thereby expanding said cavity space to foam said thermoplastic elastomer composition and forming an injection foaming product having a skin layer and a foamed layer;
   wherein the thermoplastic elastomer composition for core-back system foam injection molding comprises a thermoplastic elastomer which includes an ethylene•α olefin-based copolymer and a crystalline polyethylene-based resin, wherein said crystalline polyethylene-based resin constitutes a three-dimensional network structure in a matrix formed by said ethylene•α-olefin-based copolymer, a blowing agent and a nucleating agent, and
   wherein said thermoplastic elastomer has a melt flow rate of 5 g/10 min or more at a temperature of 230° C. and a load of 10 kg, and a melt tension of 3.0 gf or more at a temperature of 210° C. and a pulling rate of 2 m/min.

2. The foam injection molding method according to claim 1, wherein a metal mold retraction delay time is 0 to 5 seconds after the completion of filling.

3. The foam injection molding method according to claim 1, wherein said mold opening is executed in such a manner that a final thickness of said injection foaming product becomes 1.1 to 5.0 times of an initial thickness of the material filled in said cavity space in said metal mold.

4. The foam injection molding method according to claim 1, wherein said injection foaming product is formed on a surface of a base body.

5. The foam injection molding method according to claim 1, wherein said nucleating agent (5) is an inorganic compound powder of a particle diameter of 2 to 50 μm, and said blowing agent (4) is at least one selected from the group consisting of sodium hydrogencarbonate, ammonium hydrogencarbonate, ammonium chloride and ammonium carbonate, and said composition further comprises at least a weakly acidic compound selected from the group consisting of oxalic acid, malonic acid, citric acid, lactic acid, boric acid, monosodium citrate and acidic potassium tartrate.

6. The foam injection molding method according to claim 1, wherein the blowing agent comprises a blowing agent-containing resin in which a blowing agent compound is kneaded in an olefin resin; and
wherein the nucleating agent comprises a nucleating agent-containing resin in which a nucleating agent compound is kneaded in an olefin resin.

7. The foam injection molding method according to claim 6, wherein said nucleating agent compound is an inorganic compound powder of a particle diameter of 2 to 50 μm, and said blowing agent compound is at least one member selected from the group consisting of sodium hydrogencarbonate, ammonium hydrogencarbonate, ammonium chloride and ammonium carbonate, and said composition further comprises at least a weakly acidic compound selected from the group consisting of oxalic acid, malonic acid, citric acid, lactic acid, boric acid, monosodium citrate and acidic potassium tartrate.

8. The foam injection molding method according to claim 1, wherein the thermoplastic elastomer further comprises a block copolymer, wherein said crystalline polyethylene-based resin and said block copolymer constitute a three-dimensional network structure in a matrix formed by said ethylene•α-olefin-based copolymer, a blowing agent and a nucleating agent;
wherein said block copolymer is a block copolymer having a crystalline ethylene polymer block and a block having a higher compatibility to said ethylene•α olefin-based copolymer than to said crystalline polyethylene-based resin.

9. The foam injection molding method according to claim 8, wherein said nucleating agent is an inorganic compound powder of a particle diameter of 2 to 50 μm, and said blowing agent is at least one member selected from the group consisting of sodium hydrogencarbonate, ammonium hydrogencarbonate, ammonium chloride and ammonium carbonate, and said composition further comprises at least a weakly acidic compound selected from the group consisting of oxalic acid, malonic acid, citric acid, lactic acid, boric acid, monosodium citrate and acidic potassium tartrate.

10. The foam injection molding method according to claim 8, wherein the blowing agent comprises a blowing agent-containing resin in which a blowing agent compound is kneaded in an olefin resin; and
wherein the nucleating agent comprises a nucleating agent-containing resin in which a nucleating agent compound is kneaded in an olefin resin.

11. The foam injection molding method according to claim 10, wherein said nucleating agent compound is an inorganic compound powder of a particle diameter of 2 to 50 μm, and said blowing agent compound is at least one member selected from the group consisting of sodium hydrogencarbonate, ammonium hydrogencarbonate, ammonium chloride and ammonium carbonate, and said composition further comprises at least a weakly acidic compound selected from the group consisting of oxalic acid, malonic acid, citric acid, lactic acid, boric acid, monosodium citrate and acidic potassium tartrate.

12. The foam injection molding method according to claim 1, wherein the blowing agent comprises a combination of an organic blowing agent and an inorganic blowing agent.

13. The foam injection molding method according to claim 12, wherein said nucleating agent is an inorganic compound powder of a particle diameter of 2 to 50 μm, said organic blowing agent is at least one member selected from the group consisting of an azo-based blowing agent, a nitroso-based blowing agent, a sulfonyl hydrazide-based blowing agent, a triazine-based blowing agent and a tetrazole-based blowing agent, said inorganic blowing agent is at least one member selected from the group consisting of sodium hydrogencarbonate, ammonium hydrogencarbonate, ammonium chloride and ammonium carbonate, and said composition further comprises at least a weakly acidic compound selected from the group consisting of oxalic acid, malonic acid, citric acid, lactic acid, boric acid, monosodium citrate and acidic potassium tartrate.

14. The foam injection molding method according to claim 12, wherein (i) the blowing agent comprises an organic blowing agent-containing resin in which an organic blowing agent compound is kneaded in an olefin resin and an inorganic blowing agent-containing resin in which an inorganic blowing agent compound is kneaded in an olefin resin, or (ii) the blowing agent comprises an organic/inorganic blowing agent-containing resin in which an organic blowing agent compound and an inorganic blowing agent compound are both kneaded in an olefin resin; and
wherein the nucleating agent comprises a nucleating agent-containing resin in which a nucleating agent compound is kneaded in an olefin resin.

15. The foam injection molding method according to claim 14, wherein said nucleating agent compound is an inorganic compound powder of a particle diameter of 2 to 50 μm, said organic blowing agent compound is at least one member selected from the group consisting of an azo-based blowing agent, a nitroso-based blowing agent, a sulfonyl hydrazide-based blowing agent, a triazine-based blowing agent and a tetrazole-based blowing agent, said inorganic blowing agent compound is at least one member selected from the group consisting of sodium hydrogencarbonate, ammonium hydrogencarbonate, ammonium chloride and ammonium carbonate, and said composition further comprises at least a weakly acidic compound selected from the group consisting of oxalic acid, malonic acid, citric acid, lactic acid, boric acid, monosodium citrate and acidic potassium tartrate.

16. The foam injection molding method according to claim 12, wherein the thermoplastic elastomer further comprises a block copolymer, wherein said crystalline polyethylene-based resin and said block copolymer constitute a three-dimensional network structure in a matrix formed by said ethylene•α-olefin-based copolymer, a blowing agent and a nucleating agent;
wherein said block copolymer is a block copolymer having a crystalline ethylene polymer block and a block having a higher compatibility to said ethylene•α olefin-based copolymer than to said crystalline polyethylene-based resin.

17. The foam injection molding method according to claim 16, wherein said nucleating agent is an inorganic compound powder of a particle diameter of 2 to 50 μm, said organic blowing agent is at least one member selected from the group consisting of an azo-based blowing agent, a nitroso-based blowing agent, a sulfonyl hydrazide-based blowing agent, a triazine-based blowing agent and a tetrazole-based blowing agent, said inorganic blowing agent is at least one member selected from the group consisting of sodium hydrogencarbonate, ammonium hydrogencarbonate, ammonium chloride and ammonium carbonate, and said composition further comprises at least a weakly acidic compound selected from the group consisting of oxalic acid, malonic acid, citric acid, lactic acid, boric acid, monosodium citrate and acidic potassium tartrate.

18. The foam injection molding method according to claim 16, wherein (i) the blowing agent comprises an organic blowing agent-containing resin in which an organic blowing agent compound is kneaded in an olefin resin and an inorganic blowing agent-containing resin in which an inorganic blowing agent compound is kneaded in an olefin resin, or (ii) the blowing agent comprises an organic/inorganic blowing agent-containing resin in which an organic blowing agent compound and an inorganic blowing agent compound are both kneaded in an olefin resin; and wherein the nucleating agent comprises a nucleating agent-containing resin in which a nucleating agent compound is kneaded in an olefin resin.

19. The foam injection molding method according to claim 18, wherein said nucleating agent compound is an inorganic compound powder of a particle diameter of 2 to 50 µm, said organic blowing agent compound is at least one member selected from the group consisting of an azo-based blowing agent, a nitroso-based blowing agent, a sulfonyl hydrazide-based blowing agent, a triazine-based blowing agent and a tetrazole-based blowing agent, said inorganic blowing agent compound is at least one member selected from the group consisting of sodium hydrogencarbonate, ammonium hydrogencarbonate, ammonium chloride and ammonium carbonate, and said composition further comprises at least a weakly acidic compound selected from the group consisting of oxalic acid, malonic acid, citric acid, lactic acid, boric acid, monosodium citrate and acidic potassium tartrate.

* * * * *